United States Patent
Kawasaki

(10) Patent No.: US 11,425,573 B2
(45) Date of Patent: Aug. 23, 2022

(54) WIRELESS COMMUNICATION DEVICE, WIRELESS COMMUNICATION SYSTEM, AND WIRELESS COMMUNICATION METHOD

(71) Applicant: FUJITSU LIMITED, Kawasaki (JP)

(72) Inventor: Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/938,424

(22) Filed: Jul. 24, 2020

(65) Prior Publication Data
US 2020/0359232 A1 Nov. 12, 2020

Related U.S. Application Data

(63) Continuation of application No. PCT/JP2018/004479, filed on Feb. 8, 2018.

(51) Int. Cl.
*H04W 16/14* (2009.01)
*H04W 74/08* (2009.01)

(52) U.S. Cl.
CPC ....... *H04W 16/14* (2013.01); *H04W 74/0808* (2013.01)

(58) Field of Classification Search
CPC ............. H04W 16/14; H04W 74/0808; H04W 74/0816; H04B 7/0695
See application file for complete search history.

(56) References Cited

U.S. PATENT DOCUMENTS

2006/0215624 A1 9/2006 Adya et al.
2018/0035463 A1\* 2/2018 Mallik .............. H04W 74/0816

FOREIGN PATENT DOCUMENTS

JP 2006-279951 A 10/2006
WO 2017/048393 A1 3/2017

OTHER PUBLICATIONS

3GPP TS 38.300 V2.0.0, "3rd Generation partnership Project; Technical specification Group Radio Access network; NR; NR and NG-RAN Overall Description; State 2" (Release 15), Dec. 2017.
3GPP TR 38.801 V14.0.0, 3rd Generation Partnership Project; Technical Specification Group Radio Access network; Study on new radio access technology: Radio access architecture and interfaces, (Release 14), Mar. 2017.
3GPP TR 36.889 V13.0.0, "3rd Generation Partnership Project; Technical Specification Group Radio Access Network; Study on Licensed-Assisted Access to Unlicensed Spectrum" (Release 13), Jun. 2015.

(Continued)

*Primary Examiner* — Marcus Hammonds
(74) *Attorney, Agent, or Firm* — Myers Wolin, LLC.

(57) ABSTRACT

A wireless communication device that communicates wirelessly with another wireless communication device, the wireless communication device includes, a determination controller configured to determine whether or not an unlicensed frequency band is available, a signal generator configured to generate a first signal, and a transmitter configured to, when the unlicensed frequency band is available, transmit the first signal at different phases in a time domain using the unlicensed frequency band before starting to transmit a data signal.

10 Claims, 24 Drawing Sheets

WIRELESS COMMUNICATION SYSTEM 10

(56) References Cited

OTHER PUBLICATIONS

3GPP TR 38.805 V14.0.0, "3rd Generation Partnership Project; Technical Specification Group Radio Access Network; Study on New Radio access technology; 60 GHz unlicensed spectrum" (Release 14), Mar. 2017.
3GPP TR 38.803 V14.2.0, "3rd Generation Partnership Project; Technical Specification Group Radio Access Network; Study on new radio access technology: Radio Frequency (RF) and co-existence aspects" (Release 14), Sep. 2017.
QUALCOMM, "Study on NR-based Access to Unlicensed Spectrum Acronym: FS_NR-unlic", 3GPP TSG RAN Meeting #75, Agenda Item: 9.1, RP-170828, Mar. 6-9, 2017, Dubrovnik, Croatia.
Korakis et al., "CDR-MAC:A Protocol for Full Exploitation of Directional Antennas in Ad Hoc Wireless Networks", IEEE Transactions on Mobile Computing, Feb. 2008, vol. 7, No. 2, pp. 145-155.(cited on ISR for PCT/JP2018/004479).
International Search Report issued by the International Searching Authority for corresponding International Patent Application No. PCT/JP2018/004479, dated Apr. 24, 2018 with full English translation attached.
Written Opinion issued by the International Searching Authority for corresponding International Patent Application No. PCT/JP2018/004479, dated Apr. 24, 2018 with partial English translation attached.
Notice of Reasons for Refusal issued by the Japan Patent Office for corresponding Japanese Patent Application No. 2019-570229, dated Sep. 14, 2021, with a full machine English translation.

\* cited by examiner

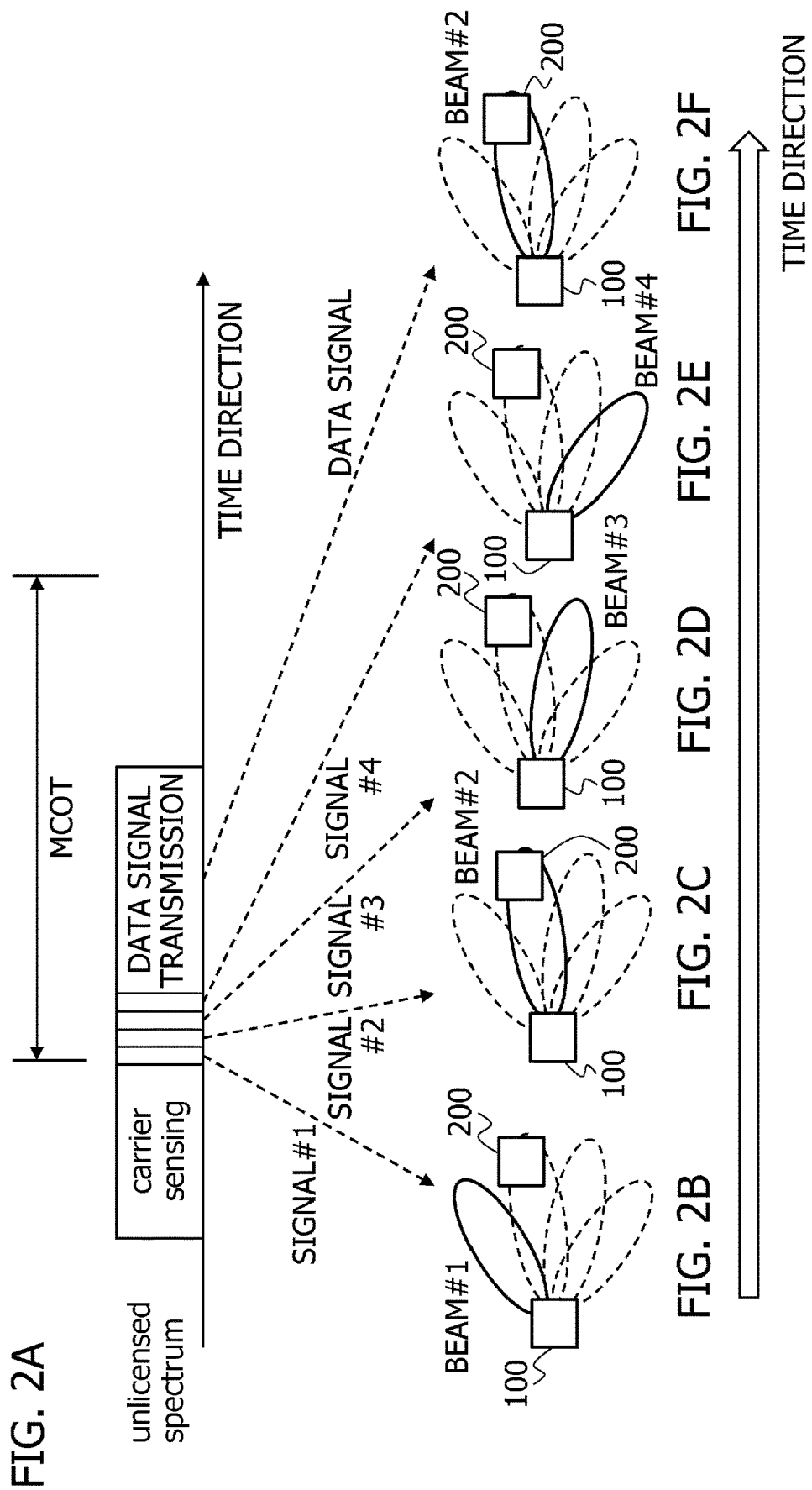

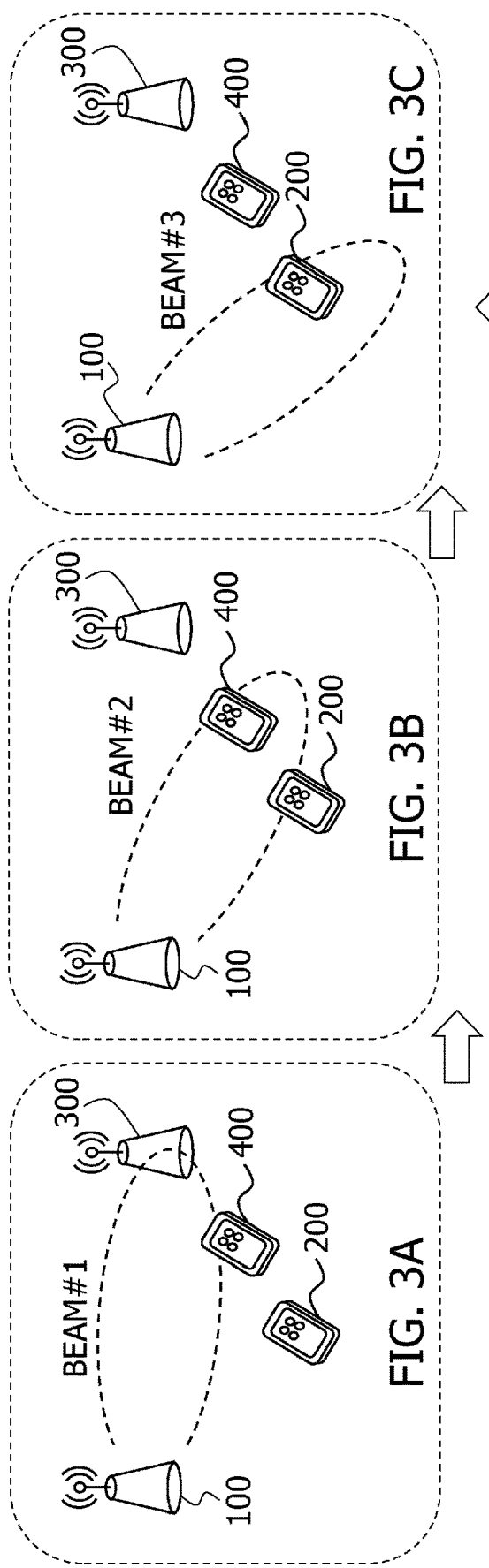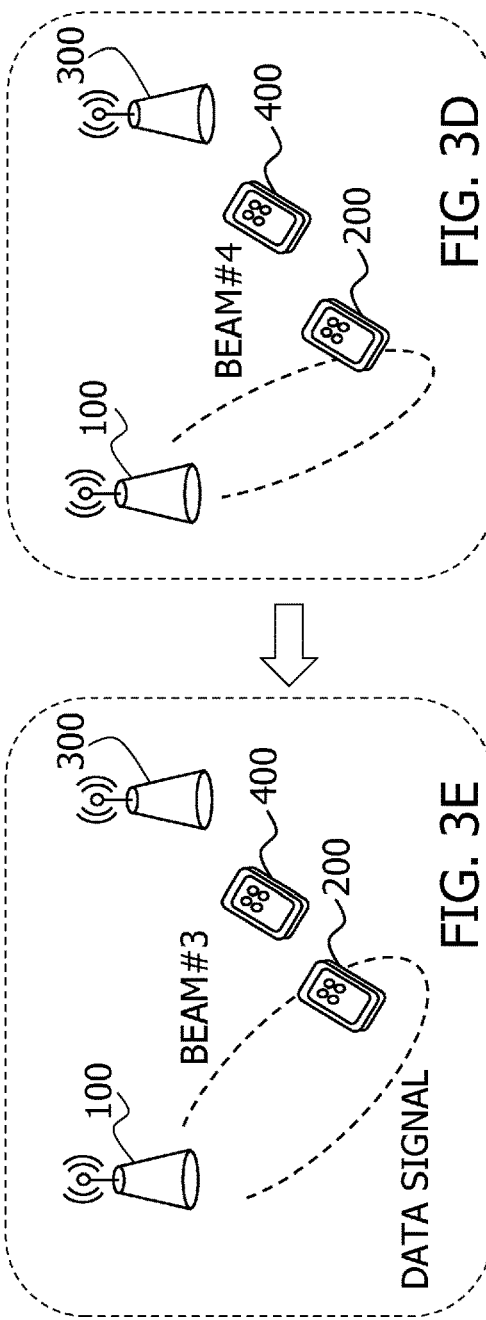

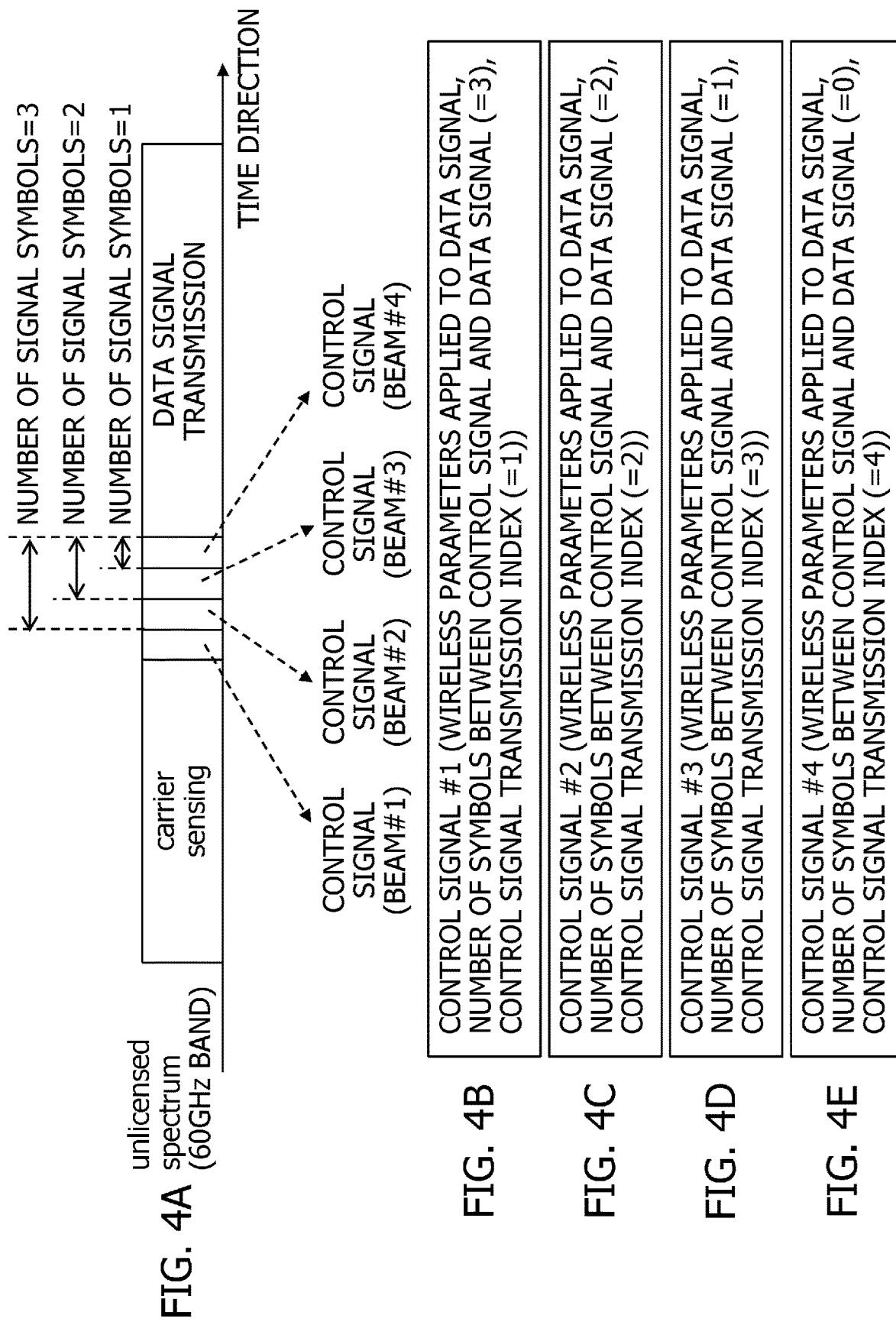

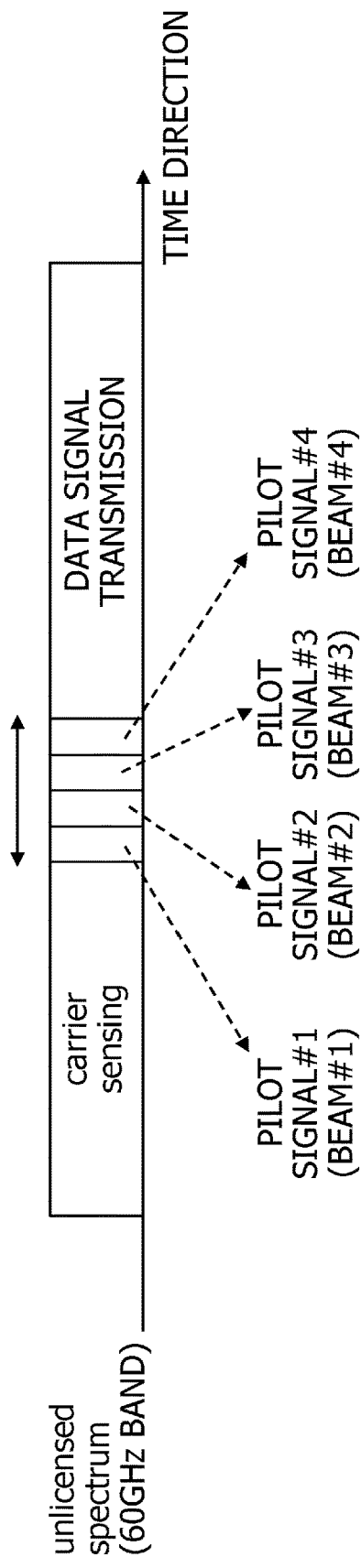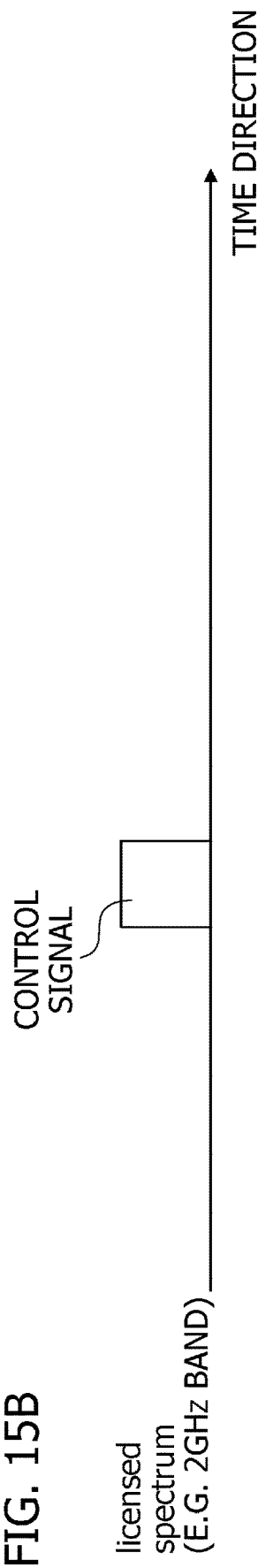
FIG. 15A
FIG. 15B

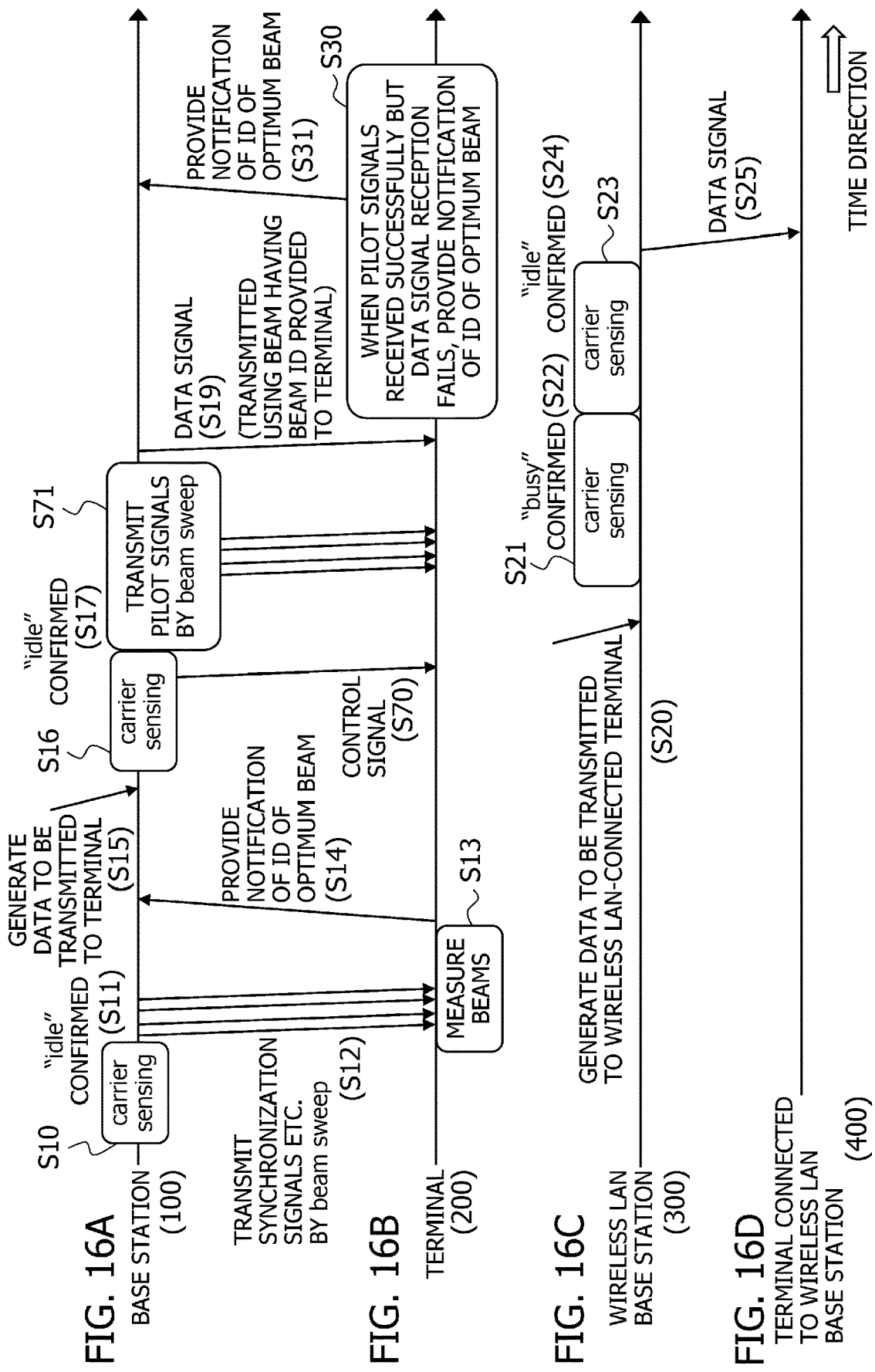

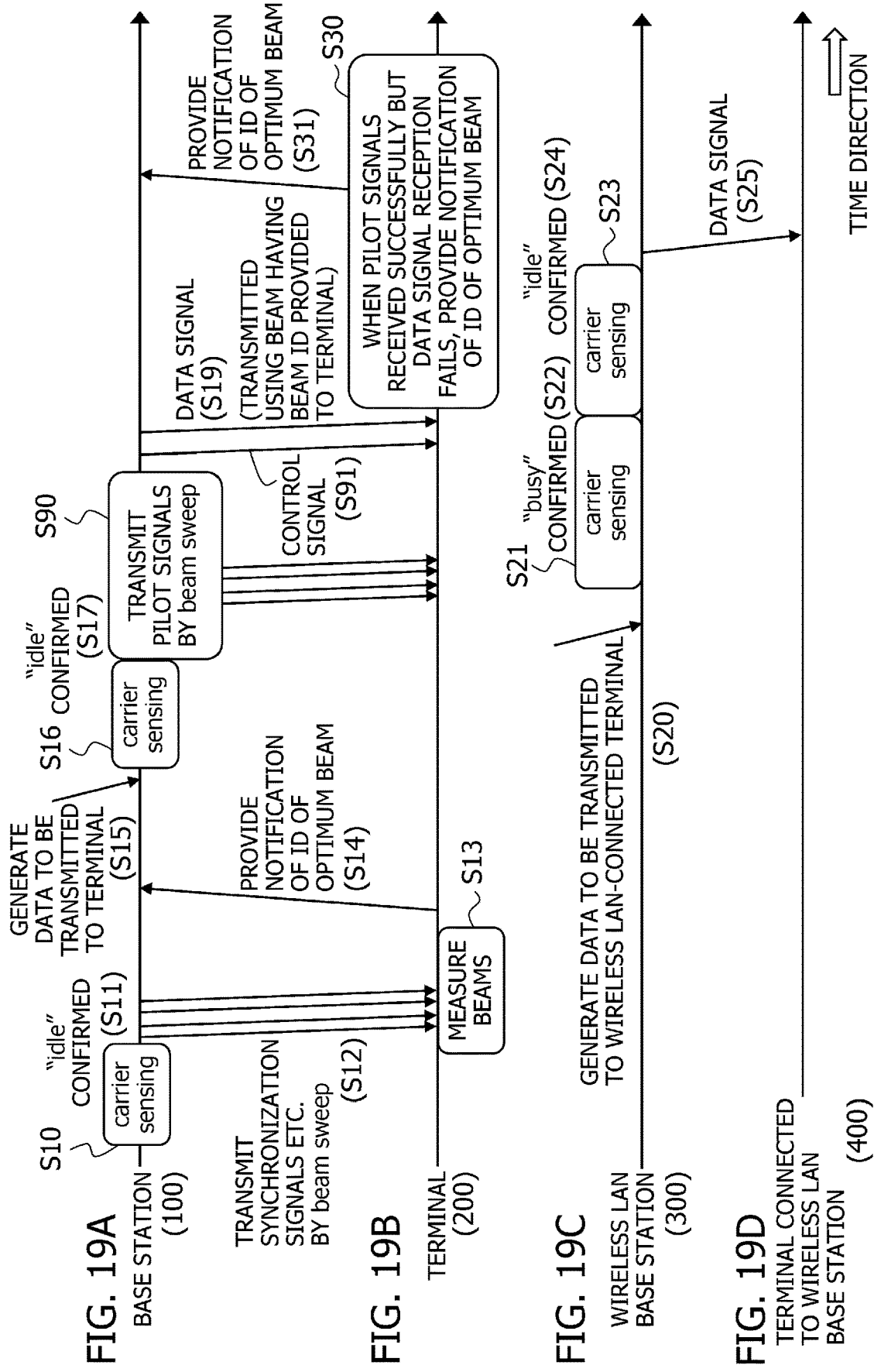

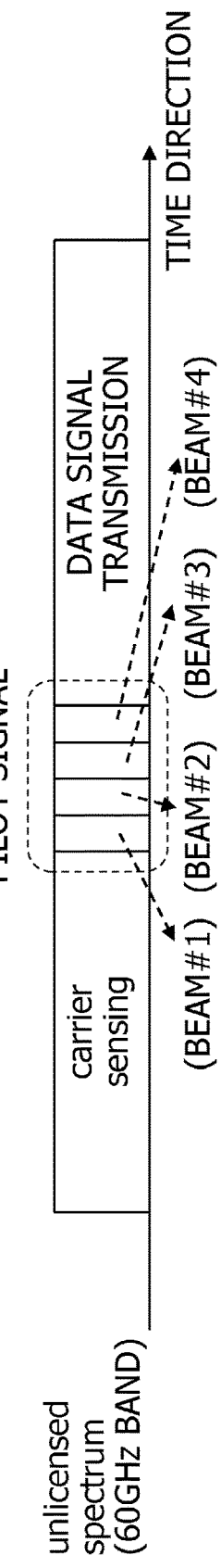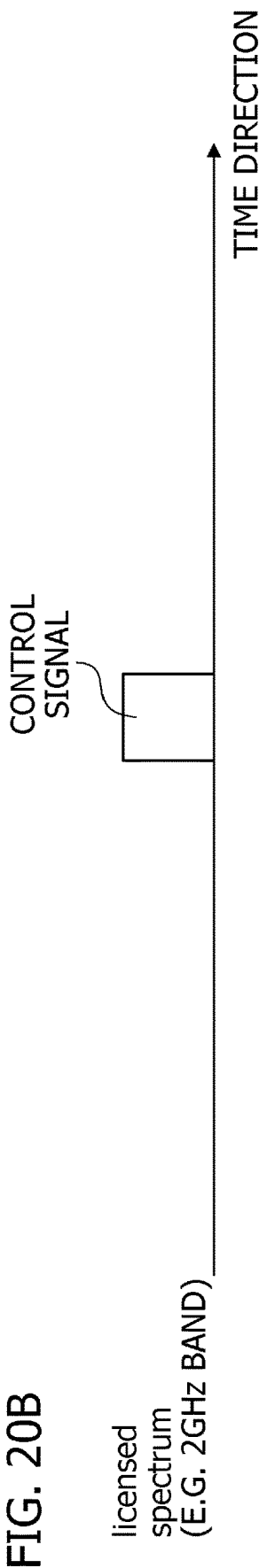

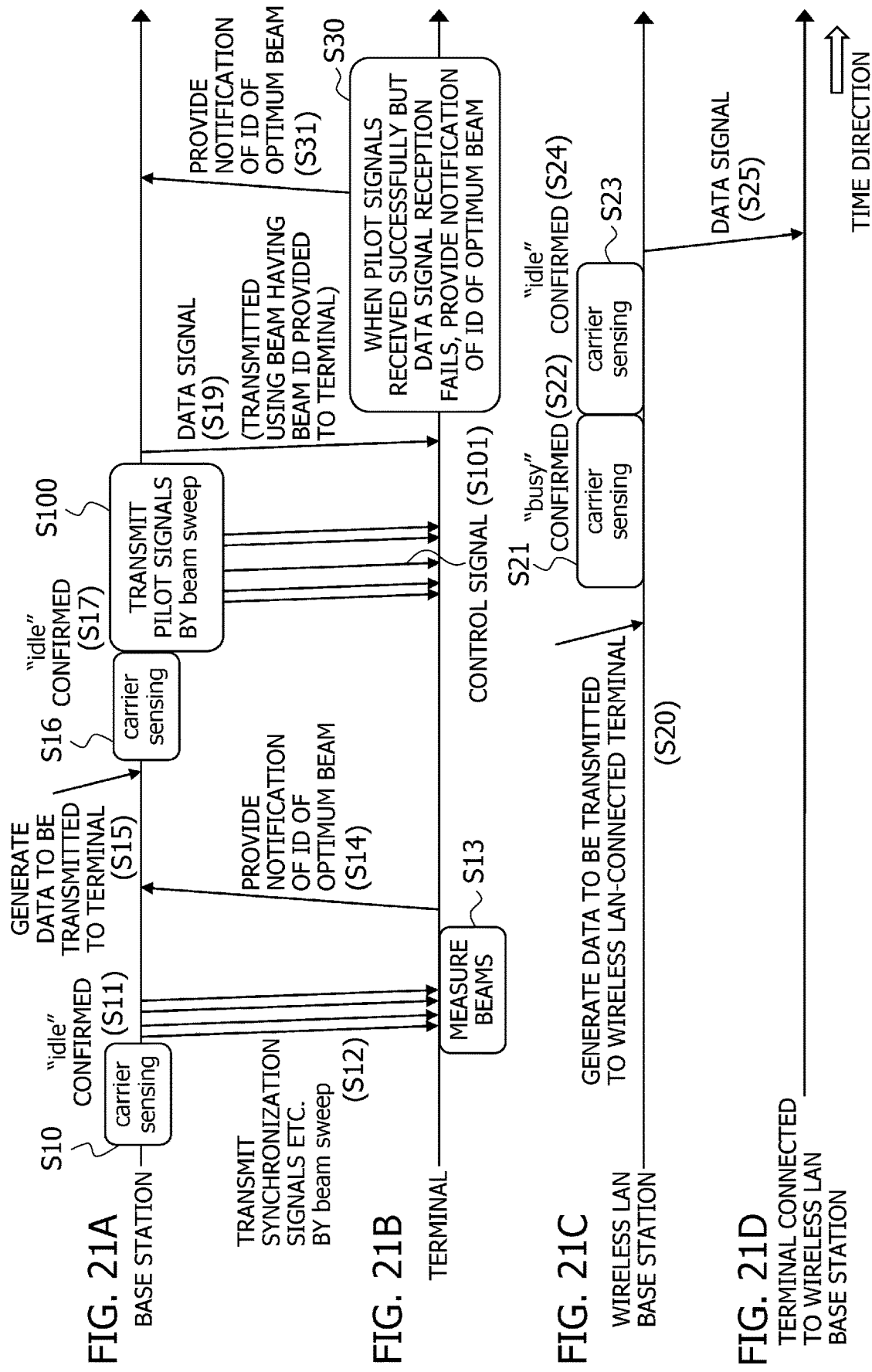

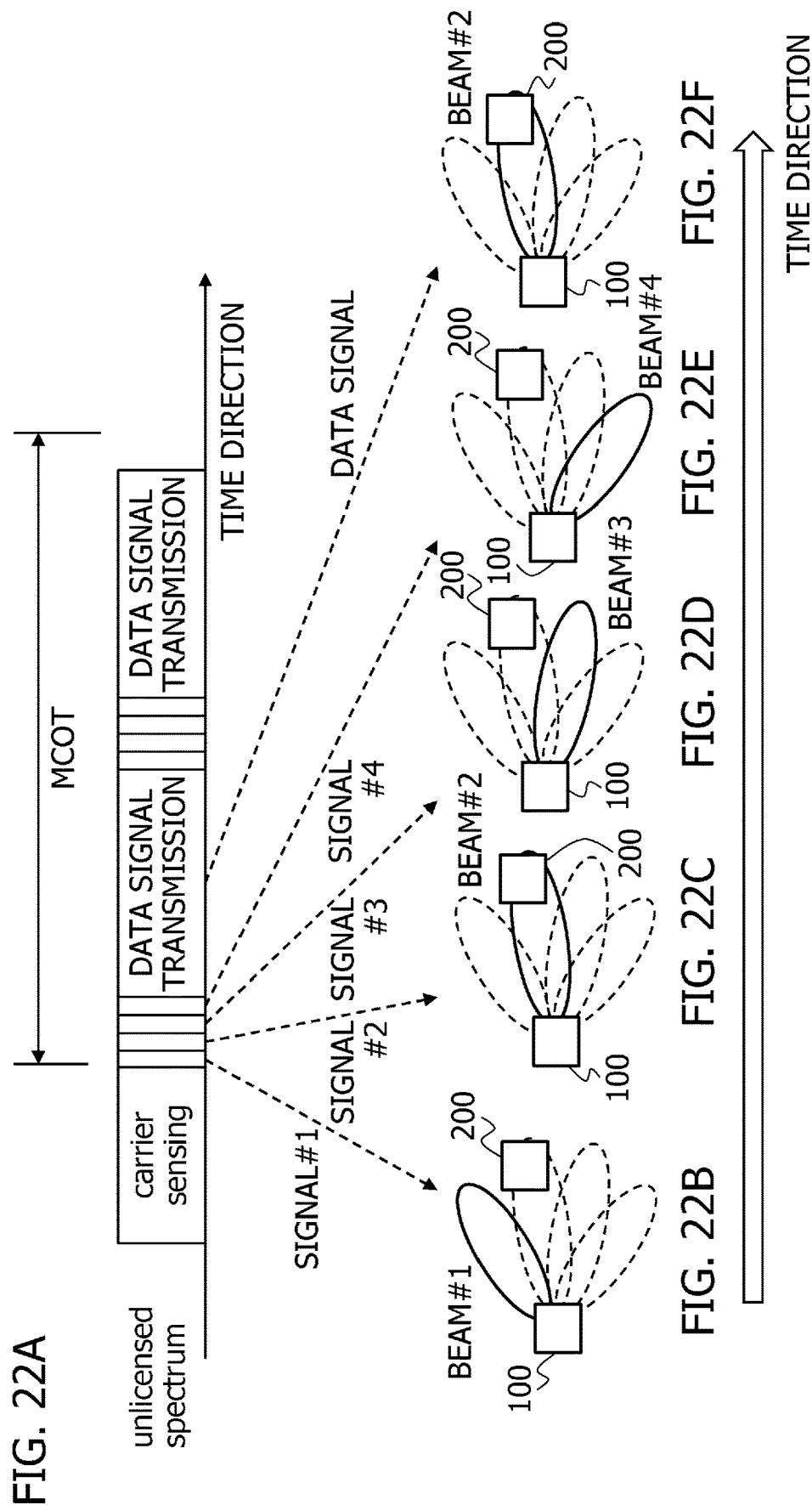

WIRELESS COMMUNICATION DEVICE, WIRELESS COMMUNICATION SYSTEM, AND WIRELESS COMMUNICATION METHOD

CROSS-REFERENCE TO RELATED APPLICATION

This application is a continuation application of International Application PCT/JP2018/004479 filed on Feb. 8, 2018 and designated the U.S., the entire contents of which are incorporated herein by reference.

FIELD

The present invention relates to a wireless communication device, a wireless communication system, and a wireless communication method.

BACKGROUND

At present, 5th generation mobile communication (also referred to hereafter as "5G") is being investigated by the standardization body, the 3rd generation partnership project (3GPP), as technology for next-generation wireless communication systems. In 5G, the continuous development of long term evolution (LTE) systems and LTE-advanced systems, new radio (NR) using a higher frequency than hitherto in order to support broadband, and so on are being investigated. Moreover, in 5G, in order to handle a wide variety of services, a large number of use cases, classified into enhanced mobile broadband (eMBB), massive machine type communications (MTC), and ultra-reliable and low latency communications (URLLC), are envisaged.

In wireless communication systems of this type, wireless communication using an unlicensed spectrum (or unlicensed frequency band) has come to attention as a method for handling high-speed, large-capacity communication.

In LTE, licensed-assisted access (LAA) using an unlicensed spectrum such as the 5 GHz band as an LTE carrier has been introduced. LAA is a technique in which communication is performed through carrier aggregation (CA) by combining an unlicensed spectrum and a licensed spectrum (or licensed frequency band). In LAA, a listen-before-talk (LBT) method may be employed. The LBT method is a mechanism in which a device performs a clear channel assessment (CCA) check before using a certain channel, for example. In the LBT method, for example, a transmitter performs carrier sensing, and when a wireless channel is "idle", the transmitter begins data transmission using that wireless channel.

With regard to 5G, meanwhile, from February to June 2018, a basic technical discussion was conducted by the 3GPP in relation to the introduction of a communication function using the 60 GHz band unlicensed spectrum. Further, use of the LBT method was proposed in relation to NR-based wireless communication using an unlicensed spectrum.

A feature of wireless communication using a frequency band such as the 60 GHz band is that greater radio wave propagation loss occurs than in wireless communication in a lower frequency band. Correspondingly, a feature of wireless communication using a frequency band such as the 60 GHz band is that the radio wave reach is shorter than in wireless communication in a lower frequency band. For example, when the power applied to an antenna in a base station device is at a certain fixed value, the radio wave reach decreases with only a single antenna, and therefore narrow-beam wireless transmission is performed using a multi-element antenna. In so doing, even in wireless communication using a frequency band such as the 60 GHz band, the radio wave reach can be extended to a similar reach to that of wireless communication in a lower frequency band without increasing the power applied to the antenna.

CITATION LIST

Non-Patent Literature

Non Patent Literature 1: 3GPP TS38. 300 V2. 0. 0 (2017-12)
Non Patent Literature 2: 3GPP TR38. 801 V14. 0. 0 (2017-03)
Non Patent Literature 3: 3GPP TR36. 889 V13. 0. 0 (2015-06)
Non Patent Literature 4: 3GPP TR38. 805 V14. 0. 0 (2017-03)
Non Patent Literature 5: 3GPP TR38. 803 V14. 2. 0 (2017-09)
Non Patent Literature 6: "New SID on NR—based Access to UnLicensed Spectrum," QuaLcomm, 3GPP TSG RAN Meeting #75, RP-170828, Mar. 6-9, 2017

SUMMARY

A wireless communication device that communicates wirelessly with another wireless communication device, the wireless communication device includes, a determination controller that determines whether or not an unlicensed frequency band is available, a signal generator that generates a first signal, and a transmitter which, when the unlicensed frequency band is available, transmits the first signal at different phases in a time domain using the unlicensed frequency band before starting to transmit a data signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2A is a view illustrating an example of use of an unlicensed spectrum, and FIGS. 2B to 2F are views illustrating an example of beam formation.

FIGS. 3A to 3E are views illustrating an example of beam formation.

FIG. 4A is a view illustrating an example of use of an unlicensed spectrum, and FIGS. 4B to 4E are views illustrating examples of information included in control signals.

FIGS. 15A and 15B are views illustrating an example of use of an unlicensed spectrum and an example of use of a licensed spectrum, respectively.

FIGS. 16A to 16D are sequence diagrams illustrating an example operation of the wireless communication system.

FIGS. 19A to 19D are sequence diagrams illustrating an example operation of the wireless communication system.

FIGS. 20A and 20B are views illustrating an example of use of an unlicensed spectrum and an example of use of a licensed spectrum, respectively.

FIGS. 21A to 21D are sequence diagrams illustrating an example operation of the wireless communication system.

FIG. 22A is a view illustrating an example of use of an unlicensed spectrum, and FIGS. 22B to 22F are views illustrating examples of beam formation.

DESCRIPTION OF EMBODIMENTS

Embodiments will be described in detail below with reference to the figures. The problems and examples illustrated herein are exemplary, and the scope of rights of the present application is not limited thereto. More specifically, even if different expressions are used in the description, as long as these expressions are technically equivalent, the technology of the present application remains applicable in spite of the differing expressions, and the scope of rights thereof is not limited thereby. Further, the embodiments may be combined as appropriate within a range that does not contradict the processing content.

Furthermore, terminology and technical content described in specification documents and articles as communication-related standards such as 3GPP standards may be employed as appropriate as the terminology used herein and the technical content described therein. The aforementioned document 3GPP TS 38. 300 V2. 0. 0 (December 2017), for example, may be cited as one of these specification documents.

When wireless communication is performed using narrow beams, the hidden terminal problem may occur.

Figure 24A:
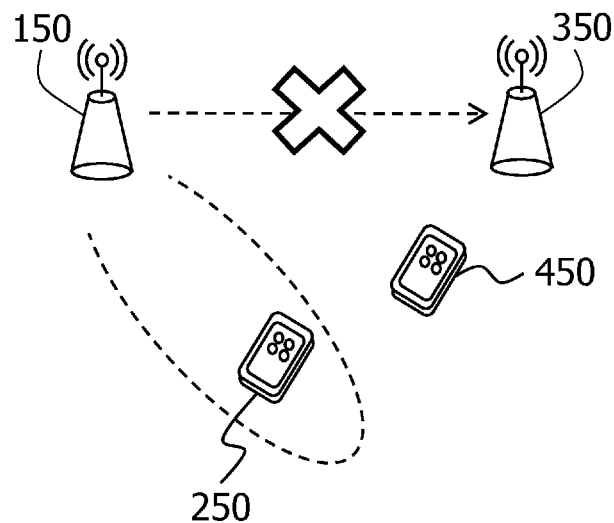
FIGS. 24A and 24B are views illustrating an example of the occurrence of the hidden terminal problem.
Figure 24B:
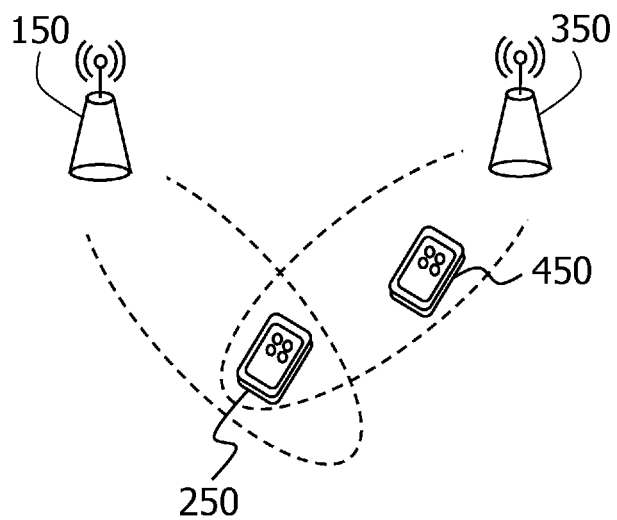

FIGS. 24A and 24B are views illustrating an example of the hidden terminal problem. As depicted in FIG. 24A, a base station 150 is capable of communicating wirelessly with a terminal 250 by performing narrow-beam wireless communication. Meanwhile, a base station 350 using a wireless LAN method does not detect a beam from the base station 150 even after performing carrier sensing in relation to the frequency band used to form the narrow beam. Therefore, the base station 350 determines that the frequency band is in an "idle" state. In this case, as depicted in FIG. 24B, the base station 350 communicates wirelessly with a terminal 450 using the same frequency band as the base station 150. During this wireless communication, a signal transmitted to the terminal 450 by the base station 350 interferes with a signal transmitted to the terminal 250 by the base station 150. This interference is sometimes known as the hidden terminal problem, for example. The hidden terminal problem becomes gradually more likely to occur as the width of the beams used for wireless signal transmission narrows.

First Embodiment

Example Configuration of Wireless Communication System

Figure 1:
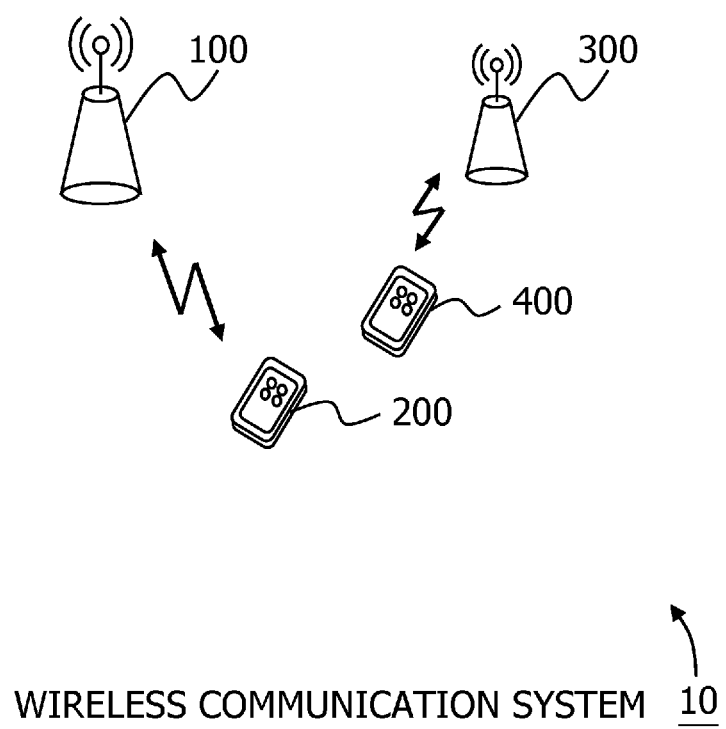
FIG. 1 is a view illustrating an example configuration of a wireless communication system.

FIG. 1 is a view illustrating an example configuration of a wireless communication system 10 according to a first embodiment.

The wireless communication system 10 includes a base station device (also referred to hereafter as the "base station") 100 and a terminal device (also referred to hereafter as the "terminal") 200.

Note that FIG. 1 also depicts a base station 300 and a terminal 400. The base station 300 is a base station that is capable of performing carrier sensing, for example. A wireless LAN may be used as a wireless communication method for performing carrier sensing. The base station 300 and the terminal 400 are capable of wireless communication using a wireless LAN, for example. Hereafter, the base station 300 will also be referred to as the wireless LAN base station 300, for example. Further, the terminal 400 will also be referred to as the terminal 400 that is connected to the wireless LAN base station 300, for example.

The base station 100 is a wireless communication device that communicates wirelessly with the terminal 200, which exists within a service provision range (or cell range) of the base station 100, in order to provide various services such as a call-making service and a Web browsing service.

The terminal 200 is a wireless communication device capable of wireless communication, such as a feature phone, a smartphone, a personal computer, a tablet terminal, or a gaming device, for example. The terminal 200 is capable of receiving the various provided services described above via the base station 100.

The base station 100 and the terminal 200 according to the first embodiment are capable of wireless communication using an unlicensed spectrum. An unlicensed spectrum is a frequency band that does not require licensing by a country or a related organization, for example. The 60 GHz band is an example of this type of frequency band. The terms "unlicensed spectrum" and "unlicensed frequency band" will be used interchangeably hereafter. The terms "LBT method" and "carrier sensing" will also be used interchangeably hereafter.

Example of Use of Unlicensed Spectrum

FIGS. 2A to 2F are views illustrating an example of use of an unlicensed spectrum in the base station 100.

As illustrated in FIG. 2A, in the first embodiment, the base station 100 performs carrier sensing in relation to the unlicensed spectrum. Then, after confirming that the frequency band is in an "idle" state and before starting to transmit a data signal, the base station 100 transmits signals (in the example of FIG. 2A, signal #1 to signal #4) by beam sweep transmission.

FIGS. 2B to 2E are views illustrating an example of beam formation. The example beams illustrated in FIGS. 2B to 2E are depicted in chronological order.

As illustrated in FIG. 2B, the base station 100 transmits signal #1 using a beam oriented in a first direction. Next, as illustrated in FIG. 2C, the base station 100 transmits signal #2 using a beam oriented in a second direction. Thereafter, as illustrated in FIGS. 2D and 2E, the base station 100 forms beams #3 and #4 in succession in different beam directions and transmits signals #3 and #4 in succession.

A beam is a bundle of wireless signals, for example. Note, however, that a single beam may be formed from either a single wireless signal or a plurality of wireless signals. In the first embodiment, examples in which a single beam is formed from a plurality of wireless signals using a plurality of antenna elements will be described.

Further, a technique for controlling the directivity of a plurality of antenna elements is also known as beamforming, for example. The base station 100 can orient a beam direction in a specific direction by controlling the phases of signals input into the plurality of antenna elements so as to electrically change the directivity thereof, for example. By executing beamforming, the base station 100 can transmit wireless signals in the direction of the terminal 200 and receive wireless signals transmitted from the direction of the terminal 200. In each of FIGS. 2B to 2E, the base station 100 can form a beam oriented in a predetermined direction by beamforming.

Furthermore, beam sweep transmission is a technique in which the base station 100, for example, transmits a narrow beam with a modified beam angle a plurality of times so that the beam reaches all areas within a cell. More specifically, in beam sweep transmission, for example, a plurality of signals having different phases in the time domain are transmitted a plurality of times in succession. Thus, as depicted in FIGS. 2B to 2E, for example, the base station 100 can form beams oriented in different directions successively over time.

Note that FIG. 2F illustrates an example in which a beam is formed in the direction of the terminal 200 by transmitting a data signal in that direction.

Hence, in the first embodiment, the base station 100 performs carrier sensing in an unlicensed spectrum, transmits signals by beam sweeping, and then transmits a data signal.

FIGS. 3A to 3D are views illustrating an example of beam formation in time series. As illustrated in FIG. 3A, the base station 100 forms beam #1 in a certain direction and transmits signal #1. If the wireless LAN base station 300 performs carrier sensing on the unlicensed spectrum at this timing, the wireless LAN base station 300 can detect signal #1 (or the reception power of signal #1). Accordingly, the wireless LAN base station 300 determines that the unlicensed spectrum is in a "busy" state.

Hence, as illustrated in FIG. 2B, the wireless LAN base station 300 defers wireless signal transmission using the unlicensed spectrum subjected to carrier sensing. The base station 100 forms beam #2 and transmits signal #2.

Further, as illustrated in FIGS. 3C and 3D, while the wireless LAN base station 300 continues to defer wireless signal transmission, the base station 100 forms beams #2 and #3 in succession and transmits signals #2 and #3 in succession.

Then, as illustrated in FIG. 3E, while the wireless LAN base station 300 continues to defer wireless signal transmission, the base station 100 transmits a data signal to the terminal 200 using beam #3.

In this case, as illustrated in FIG. 3E, the wireless LAN base station 300 does not transmit a wireless signal to the terminal 400. Therefore, in the example of FIG. 3E, the data signal transmitted from the base station 100 to the terminal 200 does not collide with a wireless signal transmitted from the wireless LAN base station 300 to the terminal 400, and as a result, no interference occurs. Hence, in the example of FIG. 3E, the hidden terminal problem does not occur during wireless communication in the unlicensed spectrum.

In the example of FIGS. 3A to 3E, beam #1 reaches the wireless LAN base station 300, and therefore, if the wireless LAN base station 300 executes carrier sensing at this timing, the wireless LAN base station 300 can detect signal #1. However, the telecommunications carrier of the base station 100 may differ from the telecommunications carrier of the wireless LAN base station 300 so that from the base station 100, it is impossible to tell where the wireless LAN base station 300 is located. Even in this case, by transmitting signals using beam sweeping, as illustrated in FIGS. 3B to 3D, one of the beams may be detected by the carrier sensing implemented in the wireless LAN base station 300. According to the first embodiment, therefore, the frequency with which interference occurs (FIG. 24B, for example) in an unlicensed frequency band can be reduced in comparison with a case where beam sweep transmission is not performed. As a result, with the wireless communication system 10, the frequency with which the hidden terminal problem occurs can be reduced.

A desired period may be set as the carrier sensing period. Alternatively, a certain fixed carrier sensing period may be set, and carrier sensing may be performed continuously a number of times selected at random by each base station 100. The period of the carrier sensing illustrated in FIG. 2A may likewise be a desired period or a continuous period of a randomly selected number of times.

Further, in the example of FIG. 2A, an example in which the base station 100 transmits four beams, namely beam #1 to beam #4, by beam sweeping is illustrated. The number of beams transmitted by beam sweeping may also be "2", "3", "5", or more.

Furthermore, in the example of FIG. 2A, signal #1 to signal #4 may all be signals having different code strings, or may all have identical code strings. For example, the code string of signal #1, the code string of signal #2, the code string of signal #3, and the code string of signal #4 may all be different, may all be the same, and so on.

Alternatively, some of signal #1 to signal #4 may have different code strings, and the others may have identical code strings. For example, the code string of signal #1 and the code string of signal #2 may be the same, the code string of signal #3 and the code string of signal #4 may be the same, the code string of signal #1 and the code string of signal #3 may be different, and so on.

Moreover, as illustrated in FIG. 2A, a maximum channel occupancy time (MCOT) may be set in the unlicensed spectrum. The MCOT expresses the maximum time a wireless channel may be occupied, for example. When the base station 100 performs carrier sensing again after exceeding the MCOT and confirms the "idle" state, the base station 100 transmits signals by beam sweeping before starting to transmit a data signal. Even before exceeding the MCOT, when the base station 100 intends to transmit a data signal after completing data signal transmission, the base station 100 can repeat the processing illustrated in FIG. 2A.

Specific examples of signals and so on will be described below in examples 1-5.

1 Example 1

FIG. 4A is a view illustrating specific examples of signals according to example 1.

As illustrated in FIG. 4A, the base station 100 transmits control signals by beam sweeping after performing carrier sensing in an unlicensed spectrum and confirming the "idle" state, and before starting to transmit a data signal. More specifically, the base station 100 transmits control signal #1 by forming beam #1, and then transmits control signal #2 by forming beam #2. Thereafter, the base station 100 forms beams #3 and 4 #, and transmits control signals #3 and #4 in succession. Beam #1 to beam #4 correspond respectively to FIGS. 2B to 2E, for example.

FIGS. 4B to 4E are views illustrating examples of information included in the control signals. As illustrated in FIGS. 4B to 4E, information indicating wireless parameters applied to the data signal is identical in all of control signal #1 to control signal #4. Examples of wireless parameters include the modulation method, the code rate, and so on, for example.

Note, however, that a number of symbols between the control signal and the data signal and a control signal transmission index (also referred to hereafter as the "control signal index") are different for each control signal.

The number of symbols between the control signal and the data signal expresses the number of symbols from the control signal to the start of data signal transmission, assuming that one control signal is transmitted using one signal symbol, for example. The number of symbols is also a transmission timing difference from the control signal to the start of data signal transmission, for example. Further, the control signal index is identification information for differentiating the control signal from the other control signals, for example.

More specifically, as illustrated in FIG. 4B, with respect to control signal #1, three signal symbols corresponding respectively to control signal #2 to control signal #4 exist, and therefore the number of signal symbols thereof is "3". Further, the control signal index of control signal #1 is "1".

Further, as illustrated in FIG. 4C, the number of signal symbols of control signal #2 is "2", and the control signal index thereof is "2". Furthermore, as illustrated in FIG. 4D, the number of signal symbols of control signal #3 is "1", and the control signal index thereof is "3", and as illustrated in FIG. 4E, the number of signal symbols of control signal #4 is "0", and the control signal index thereof is "4".

The terminal 200, upon receipt of a control signal, can ascertain the transmission start timing of the data signal (for example, the time up to the start of data transmission following receipt of control signal #1) from the number of signal symbols, for example. Further, upon receipt of a control signal, the terminal 200 can feed back information to the base station 100 indicating the control signal that has been received (or the control signal that was received in the best state) from the control signal index, for example. Thus, even when data signal reception fails, for example, the base station 100 can resend the data signal using the most suitable transmission beam #1 for the terminal 200. A specific example will be described below.

Note that FIGS. 4B to 4E depict an example in which three items, namely the wireless parameters, the number of symbols, and the control signal index, are all included as the information included in the control signals, but it is sufficient for at least one item to be included.

1.1 Example Configurations of Base Station and Terminal According to Example 1

Figure 5:
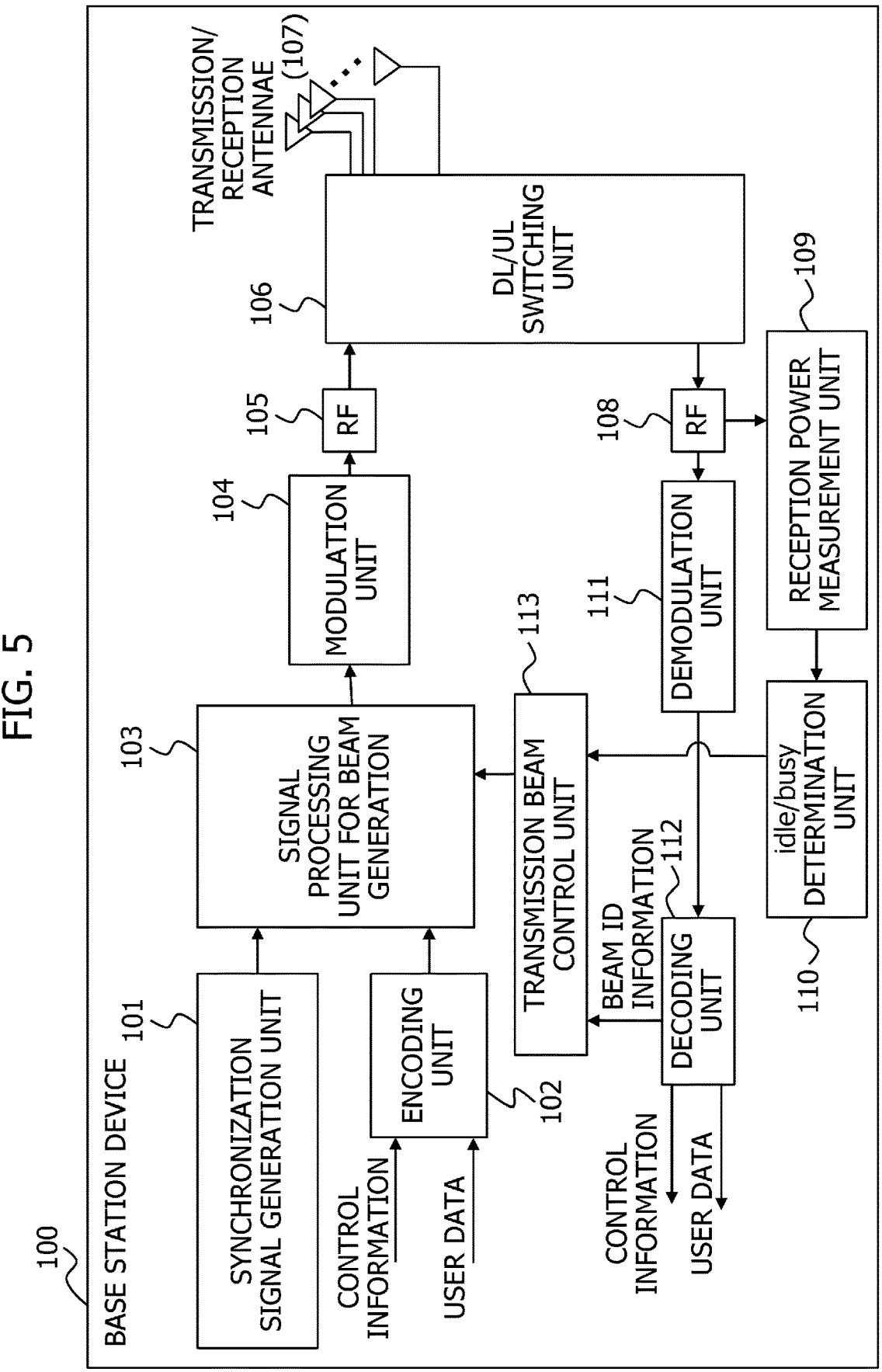
FIG. 5 is a view illustrating an example configuration of a base station device.
Figure 6:
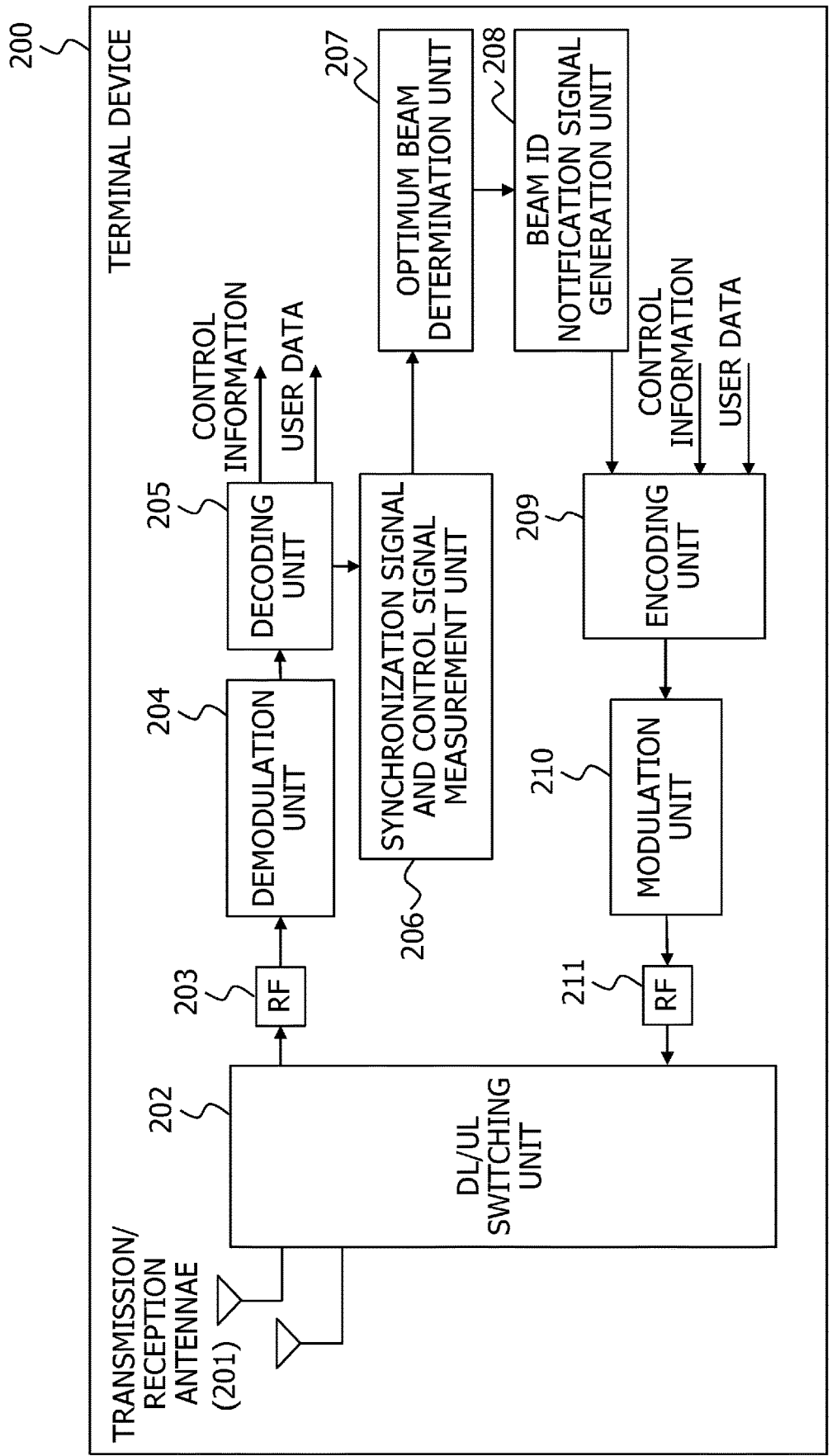
FIG. 6 is a view illustrating an example configuration of a terminal device.

FIGS. 5 and 6 are views respectively illustrating example configurations of the base station 100 and the terminal 200.

As illustrated in FIG. 5, the base station 100 includes a synchronization signal generation unit (generator) 101, an encoding unit 102, a signal processing unit for beam generation (also referred to hereafter as the "signal processing unit") 103, a modulation unit (modulator) 104, a radio frequency (RF) unit 105, a down link (DL)/up link (UL) switching unit 106, and a plurality of transmission/reception antennae (also referred to hereafter as the "antennae") 107. The base station 100 also includes an RF unit 108, a reception power measurement unit 109, and idle/busy determination unit (determination controller) 110, a demodulation unit 111, a decoding unit 112, and a transmission beam control unit (controller) 113.

A transmission unit (transmitter) may include the RF unit 105 and the antennae 107 or may include the RF unit 105, for example. Further, a reception unit (receiver) may include the antennae 107 and the RF unit 108 or may include the RF unit 108, for example.

The synchronization signal generation unit 101 is a signal generation unit for generating synchronization signals and outputting the generated synchronization signals to the signal processing unit (processor) 103. The synchronization signal generation unit 101 can generate the synchronization signals using a signal series such as the Zadoff-Chu sequence, for example.

The encoding unit 102 implements error correction/encoding processing (also referred to hereafter as "encoding processing") on control information and user data, and outputs the encoded control information and user data to the signal processing unit 103.

The signal processing unit 103 implements digital beamforming processing, for example, on the synchronization signals, the encoded control information, and the encoded user data.

More specifically, with respect to the synchronization signals, for example, upon receipt from the transmission beam control unit 113 of a command signal commanding beam sweep transmission of the synchronization signals, the signal processing unit 103 outputs synchronization signals acquired by adjusting the phases of the synchronization signals respectively transmitted from the antennae 107. At this time, the signal processing unit 103 outputs a plurality of synchronization signals having different phases in the time domain a plurality of times in succession in accordance with a time, a direction, a period, and so on of the beam sweeping, which are included in the command signal. Thus, synchronization signals can be transmitted from the antennae 107 by beam sweep transmission, for example.

Further, with respect to the encoded control information, for example, upon receipt from the transmission beam control unit 113 of a command signal commanding beam sweep transmission of the control signals, the signal processing unit 103 outputs control information acquired by adjusting the phases of the control signals respectively transmitted from the antennae 107. At this time, the signal processing unit 103 outputs a plurality of control information having different phases in the time domain a plurality of times in succession in accordance with the time, direction, period, and so on of the beam sweeping, which are included in the command signal. Thus, control signals can be transmitted from the antennae 107 by beam sweep transmission, for example.

Furthermore, upon receipt from the transmission beam control unit 113 of a command signal commanding beamforming of the user data, for example, the signal processing unit 103 executes the following processing. With respect to the encoded user data, the signal processing unit 103 outputs user data acquired by adjusting the phases of data signals respectively transmitted from the antennae 107 in accordance with a direction and so on included in the command signal. Thus, a data signal oriented in a certain direction can be transmitted from the antennae 107 by beamforming, for example.

Digital precoding processing, for example, may be cited as a specific example of digital beamforming processing. In this case, for example, the signal processing unit 103 may hold a precoding matrix formula in an internal memory, read a precoding matrix corresponding to the command signal, apply the read precoding matrix to the synchronization signals, encoded control information, and encoded user data, and output phase-adjusted synchronization signals and so on.

The modulation unit 104 implements modulation processing on the phase-adjusted synchronization signals, control information, and user data output from the signal processing unit 103, and then outputs synchronization signals, control signals, and data signals. Note that with regard to the control signals, the modulation unit 104 is capable of serving as a control signal generation unit (or signal generation unit), for example.

The RF unit 105 implements frequency conversion (up-conversion) processing from a baseband spectrum to the unlicensed spectrum on the synchronization signals, control signals, and data signals output from the modulation unit 104. For this purpose, the RF unit 105 includes a frequency conversion circuit, for example. The RF unit 105 outputs the synchronization signals, control signals, and data signals (also referred to hereafter as the "wireless signals") of the unlicensed spectrum to the DL/UL switching unit 106.

The DL/UL switching unit 106 outputs the wireless signals output from the RF unit 105 to the antennae 107 at the time of a DL, and outputs the wireless signals output from the antennae 107 to the RF unit 108 at the time of a UL. Note that the DL direction is a communication direction from the base station 100 to the terminal 200, and the UL direction is a communication direction from the terminal 200 to the base station 100.

The antennae 107 are constituted by a multi-element antenna including a plurality of antenna elements, for example. Hereafter, the terms antenna elements and antennae will be used interchangeably.

Further, the antennae 107 transmit the wireless signals output from the DL/UL switching unit 106 to the terminal 200. At this time, the antennae 107 transmit a plurality of control signals or synchronization signals having different phases in the time domain a plurality of times in succession after confirming that the unlicensed frequency band is available and before starting to transmit a data signal. Thus, for example, the base station 100 can form the beams illustrated in FIGS. 2B to 2E in an unlicensed frequency band and transmit control signals and synchronization signals by beam sweep transmission.

Furthermore, the antennae 107 receive wireless signals transmitted from the terminal 200 and output the received wireless signals to the DL/UL switching unit 106.

The RF unit 108 converts (down-converts) the wireless signals in the unlicensed spectrum, output from the DL/UL switching unit 106, into reception signals in the baseband spectrum. For this purpose, the RF unit 108 includes a frequency conversion circuit, for example. The RF unit 108 outputs the converted reception signals to the demodulation unit 111 and the reception power measurement unit 109. Note that the RF unit 108 is also capable of converting wireless signals in a licensed spectrum into reception signals in the baseband spectrum.

The reception power measurement unit 109 measures the reception power of the reception signals in the unlicensed spectrum. The reception power measurement unit 109 may, for example, measure the reception power over the carrier sensing period and output the measured reception power to the idle/busy determination unit 110 as appropriate, or may output an average value, a maximum value, a minimum value, a mean value, or the like of the reception power measured over the carrier sensing period.

The idle/busy determination unit 110 determines (or confirms) whether or not the unlicensed frequency band is available on the basis of the reception power output from the reception power measurement unit 109 (or the reception signals in the unlicensed spectrum). For example, the idle/busy determination unit 110 determines that the unlicensed frequency band is in an "idle" state when the reception power is at or below a determination threshold, and determines that the unlicensed frequency band is in a "busy" state when the reception power is higher than the determination threshold. The idle/busy determination unit 110 then outputs the determination result to the transmission beam control unit 113.

The demodulation unit 111 implements demodulation processing on the reception signals in order to demodulate the control information, user data, and so on from the reception signals. The demodulation unit 111 then outputs the demodulated control information, user data, and so on to the decoding unit 112.

The decoding unit 112 implements error correction/decoding processing (also referred to hereafter as "decoding processing") on the demodulated control information, user data, and so on in order to reproduce the control information, the user data, and beam ID information. The decoding unit 112 outputs the reproduced control information and user data to another processing unit, and outputs the reproduced beam ID information to the transmission beam control unit 113.

The transmission beam control unit (or control unit) 113 outputs a command signal to the signal processing unit 103 on the basis of the determination result received from the idle/busy determination unit 110.

For example, having acquired a determination result indicating the "idle" state, the transmission beam control unit 113 outputs a command signal commanding beam sweep transmission of the control signals or the synchronization signals to the signal processing unit 103. At this time, the transmission beam control unit 113 includes information indicating the time, direction, period, and so on of the beam sweeping in the command signal.

Further, after outputting a signal commanding beam sweep transmission of the control signals, for example, the transmission beam control unit 113 outputs a command signal commanding beamforming of the user data to the signal processing unit 103. The transmission beam control unit 113 also outputs a command signal commanding beamforming of the user data to the signal processing unit 103 after acquiring a beam ID from the decoding unit 112 within a predetermined period after outputting a command signal relating to the control signals.

As illustrated in FIG. 6, the terminal 200 includes transmission/reception antennae (also referred to hereafter as the "antennae") 201, a DL/UL switching unit 202, an RF unit 203, a demodulation unit 204, a decoding unit 205, a synchronization signal and control signal measurement unit 206, and an optimum beam determination unit 207. The terminal 200 also includes a beam ID notification signal generation unit 208, an encoding unit 209, a modulation unit 210, and an RF unit 211.

The antennae 201 receive wireless signals transmitted from the base station 100 and output the received wireless signals to the DL/UL switching unit 202. Further, the antennae 201 transmit wireless signals output from the DL/UL switching unit 202 to the base station 100.

The DL/UL switching unit 202 outputs the wireless signals output from the antennae 201 to the RF unit 203 at the time of a DL, and outputs the wireless signals output from the RF unit 211 to the antennae 201 at the time of a UL.

The RF unit 203 converts (down-converts) wireless signals in the unlicensed spectrum into baseband signals in the baseband spectrum by implementing frequency conversion processing on the wireless signals output from the DL/UL switching unit 202. For this purpose, the RF unit 203 includes a frequency conversion circuit, for example. The RF unit 203 then outputs the converted baseband signals to the demodulation unit 204.

The demodulation unit 204 implements demodulation processing on the baseband signals in order to demodulate the control information, user data, synchronization signals, and control signals. The demodulation unit 204 then outputs the demodulated control information, user data, synchronization signals, and control signals to the decoding unit 205.

The decoding unit 205 implements decoding processing on the demodulated control information, user data, synchronization signals, and control signals in order to reproduce the control information, user data, synchronization signals, and control signals. The demodulation unit 204 outputs the reproduced control information and user data to another processing unit, and outputs the reproduced synchronization signals and control signals to the synchronization signal and control signal measurement unit 206.

The synchronization signal and control signal measurement unit 206 measures a plurality of control signals and synchronization signals transmitted by beam sweep transmission, for example, and outputs a measurement result for each beam to the optimum beam determination unit 207. The synchronization signal and control signal measurement unit 206 measures the reception power of the control signals and synchronization signals, for example.

The optimum beam determination unit 207 determines the optimum beam from among the plurality of measurement results acquired in relation to the control signals and synchronization signals. The optimum beam determination unit 207 then outputs information indicating the determined optimum beam to the beam ID notification signal generation unit 208. For example, the optimum beam determination unit 207 determines the beam having the largest reception power, among the plurality of measurement results, to be the optimum beam. In this case, with respect to the control signals, the control signal indices (FIGS. 4B to 4E, for example) are included in the measurement results, and therefore the optimum beam determination unit 207 may use the control signal indices to determine the optimum beam. Likewise with respect to the synchronization signals, a different synchronization signal index, for example, is included in each beam, similarly to the control signal indices, and therefore the optimum beam determination unit 207 may use the synchronization signal indices to determine the optimum beam.

The beam ID notification signal generation unit 208 generates a beam ID notification signal including the beam ID of the optimum beam on the basis of the information indicating the optimum beam. The beam ID notification signal generation unit 208 then outputs the generated beam ID notification signal to the encoding unit 209.

The encoding unit 209 implements encoding processing on the beam ID notification signal, the control information, and the user data, and outputs the encoded beam ID notification signal, control information, and user data to the modulation unit 210.

The modulation unit 210 implements modulation processing on the encoded beam ID notification signal, control information, and user data, and outputs the modulated beam ID notification signal, control signals, and data signal to the RF unit 211.

The RF unit 211 converts (up-converts) the signals in the baseband spectrum into wireless signals in the unlicensed spectrum by implementing frequency conversion processing into the unlicensed spectrum on the control signals and data signal. Further, the RF unit 211 converts (up-converts) the beam ID notification signal in the baseband spectrum into a wireless signal in a licensed spectrum by implementing frequency conversion processing into a licensed spectrum on the beam ID notification signal. For this purpose, the RF unit 211 includes a frequency conversion circuit, for example. The RF unit 211 then outputs the wireless signals to the DL/UL switching unit 202.

1.2 Example Operation of Example 1

1.2.1 Example Sequence

FIGS. 7A to 7D are views illustrating an example sequence of example 1.

Figure 7:
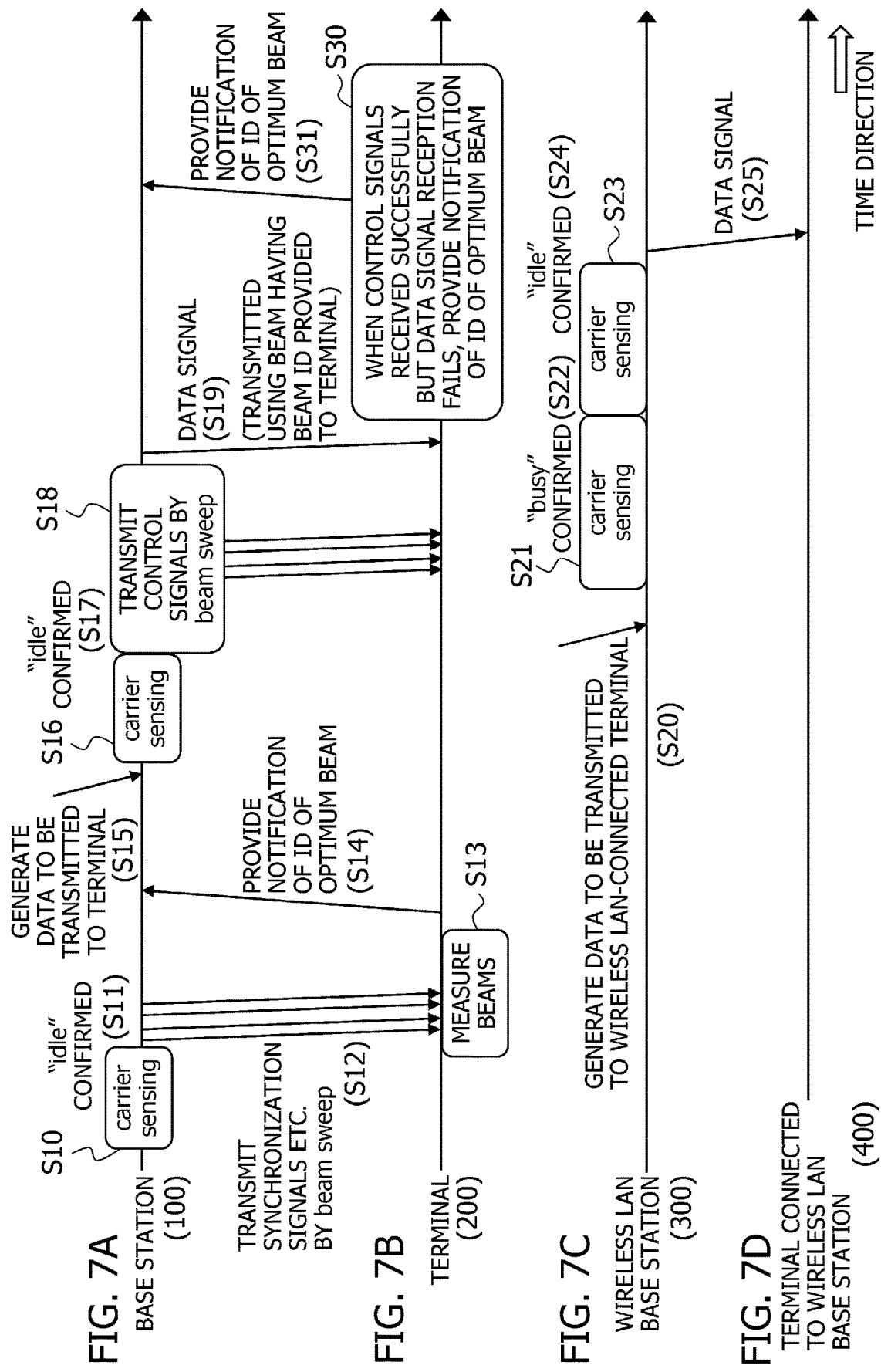
FIGS. 7A to 7D are sequence diagrams illustrating an example operation of the wireless communication system.

As illustrated in FIG. 7A, the base station 100 performs carrier sensing in the unlicensed spectrum (S10). For example, the reception power measurement unit 109 measures the reception power of the unlicensed spectrum, and the idle/busy determination unit 110 performs carrier sensing by making a determination on the basis of the measurement result.

Next, the base station 100, after confirming through the carrier sensing that the unlicensed spectrum is in the "idle" state (S11), performs beam sweep transmission on the synchronization signals (S12). Similarly to the case illustrated in FIGS. 2B to 2E, during beam sweep transmission of the synchronization signals, the base station 100 transmits the synchronization signals by forming beams oriented successively in different directions. For example, the base station 100 performs the following processing.

The transmission beam control unit 113, having acquired a determination result indicating the "idle" state from the idle/busy determination unit 110, outputs a command signal commanding beam sweep transmission of the synchronization signals to the signal processing unit 103. In response to the command signal, the signal processing unit 103 performs phase adjustment on the synchronization signals, whereby the synchronization signals are transmitted from the antennae 107 by beam sweeping. At this time, the signal processing unit 103 may perform phase adjustment using a precoding matrix.

As illustrated in FIG. 7B, the terminal 200 measures the beams on the basis of the synchronization signals transmitted by beam sweeping (513). The terminal 200 then transmits the beam ID information of the optimum beam, among the measured beams, to the base station 100 using a licensed spectrum (S14).

Figure 8:
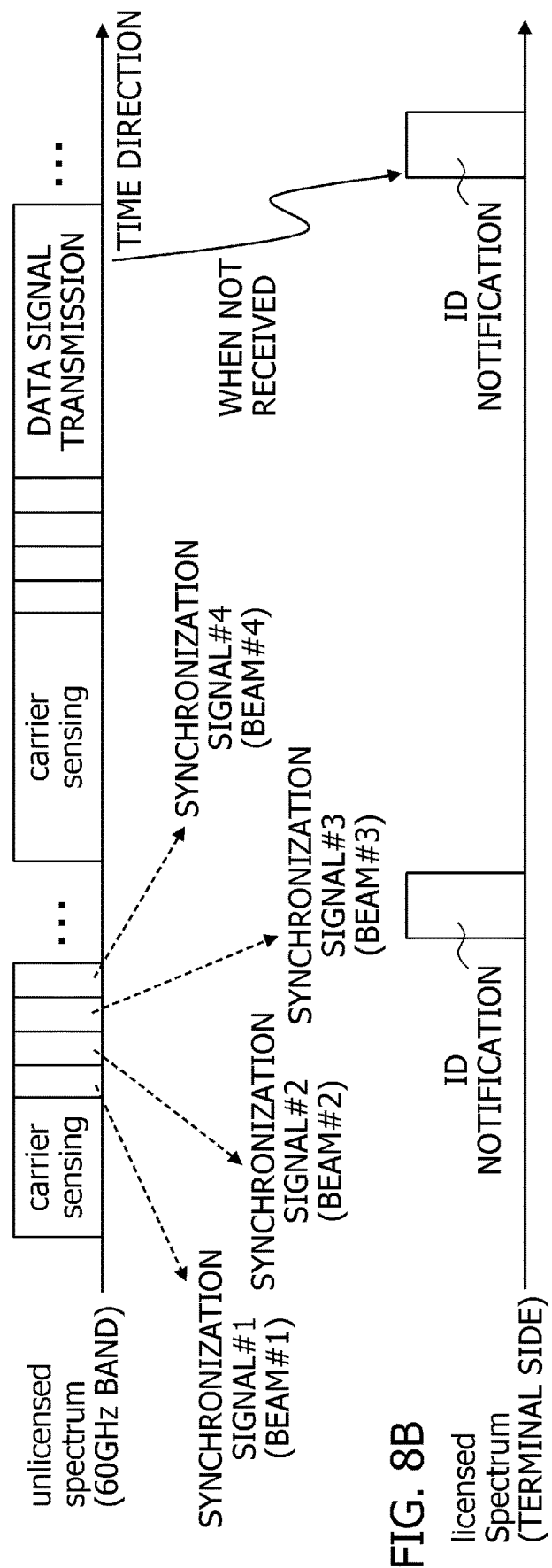
FIGS. 8A and 8B are views illustrating an example of use of an unlicensed spectrum and an example of use of a licensed spectrum, respectively.

FIGS. 8A and 8B are views illustrating an example of a relationship between an unlicensed spectrum and a licensed spectrum. As illustrated in FIG. 8A, after performing carrier sensing on the unlicensed spectrum, the base station 100 transmits the synchronization signals by beam sweeping using the unlicensed spectrum. Further, as illustrated in FIG. 8B, the terminal 200 selects the optimum beam from the beams and transmits the beam ID information using the licensed spectrum. For example, the terminal 200 performs the following processing.

The synchronization signal and control signal measurement unit 206 measures the reception power of each of the plurality of synchronization signals. The optimum beam determination unit 207 determines the beam that includes the synchronization signal having the largest reception power from among the plurality of synchronization signals, and generates beam ID information for the determined beam. The beam ID notification signal generation unit 208 generates a beam ID notification signal including the beam ID information, and transmits the generated beam ID notification signal to the base station 100. At this time, the RF unit 211 frequency-converts the beam ID notification signal in the baseband to the licensed spectrum so that the base station 100 can transmit the beam ID notification signal to the base station 100 in the licensed spectrum.

Returning to FIG. 7A, next, when data to be transmitted to the terminal 200 are generated (S15), the base station 100 performs carrier sensing on the unlicensed spectrum (S16). The data to be transmitted to the terminal 200 may be generated when the base station 100 receives data to be transmitted to the terminal 200 from another communication device or the like, for example.

Next, after confirming that the unlicensed spectrum is in the "idle" state (S17), the base station 100 performs beam sweep transmission on the control signals (S18). For example, the base station 100 performs the following processing.

The idle/busy determination unit 110 outputs a determination result indicating that the unlicensed spectrum is in the "idle" state to the transmission beam control unit 113. The transmission beam control unit 113 receives the determination result and outputs a command signal commanding beam sweep transmission of the control signals to the signal processing unit 103. Upon receipt of the command signal, the signal processing unit 103 can transmit the control signals by beam sweeping by performing phase adjustment on the control signals.

Note that a number of symbols and a control signal index are included in the control information for each predetermined amount of information, for example. As a result of the modulation processing performed by the modulation unit 104, the control information is allocated to a single signal symbol in units of the predetermined amount of information. Thus, for example, a number of symbols and a control signal index are included in each control signal.

It is assumed that at this time, as illustrated in FIG. 7C, the wireless LAN base station 300 generates data to be transmitted to a wireless LAN-connected terminal (S20) and performs carrier sensing on the same unlicensed spectrum as that used by the base station 100 (S21). In this case, the wireless LAN base station 300 receives the signals transmitted by the base station 100 and thereby confirms, as the result of the carrier sensing, that the unlicensed spectrum is in the "busy" state (S22). Accordingly, the wireless LAN base station 300 defers data signal transmission.

Meanwhile, the base station 100, after transmitting the control signals by beam sweeping, forms a beam corresponding to the received beam ID information (S14) in accordance with the beam ID information, and transmits a data signal (S19). For example, the base station 100 performs the following processing.

The transmission beam control unit 113, having received the beam ID information from the decoding unit 112, temporarily holds the beam ID information in an internal memory, and when beam sweep transmission of the control signals (S18) is complete, reads the beam ID information from the internal memory. The transmission beam control unit 113 then outputs a command signal commanding beamforming of the user data to the signal processing unit 103. At this time, the transmission beam control unit 113 outputs a command signal including the beam ID information. The signal processing unit 103, having received the command signal, performs phase adjustment on the user data so as to form a beam corresponding to the beam ID information included in the command signal. In this case, the signal processing unit 103 may perform phase adjustment using a precoding matrix corresponding to the beam ID information.

When the terminal 200 successfully receives the control signals (S18) but fails to receive the data signal (S19), the terminal 200 transmits the beam ID of the optimum beam among the plurality of beams formed by the beam sweep transmission to the base station 100 (S30, S31).

For example, in the base station 100, the beam to be used to transmit the data signal is formed in accordance with the beam ID information (S14) fed back by the terminal 200 as the optimum beam. However, the terminal 200 may move after transmitting the beam ID (S14) but before receiving the data signal (S19). As a result of this movement, the beam formed at the time of the data signal may not be the optimum beam for the terminal 200. At this time, the terminal 200 may successfully receive the control signals but fail to receive the data signal. Hence, the terminal 200 transmits the control signal index (FIGS. 4B to 4E, for example) of the optimum control signal among the plurality of control signals transmitted by beam sweeping to the base station 100. The base station 100 forms the optimum beam for the terminal 200 on the basis of the control signal index and then resends the data signal.

For example, the terminal 200 performs the following processing. The synchronization signal and control signal measurement unit 206 measures the reception power of each of the plurality of received control signals and holds the measurement results in an internal memory together with the control signal indices. The decoding unit 205 then checks whether the user data were decoded normally during decoding thereof, and when the user data were not decoded normally, outputs a signal indicating this to the synchronization signal and control signal measurement unit 206. Having received the signal, the synchronization signal and control signal measurement unit 206 reads the control signal indices and measurement results from the internal memory and outputs the read control signal indices and measurement results to the optimum beam determination unit 207. The optimum beam determination unit 207 determines the control signal index of the optimum control signal from the measurement results, and outputs the determined control signal index to the beam ID notification signal generation unit 208. The beam ID notification signal generation unit 208 generates a beam ID notification signal including the control signal index, and transmits the generated beam ID notification signal to the base station 100.

Likewise at this time, similarly to S14, the terminal 200 transmits the beam ID information using a licensed spectrum (FIG. 8B, for example).

Meanwhile, the wireless LAN base station 300, after confirming the "busy" state (S22) following beam sweep transmission of the control signals (S18), performs carrier sensing again (S23). After confirming that the unlicensed spectrum is in the "idle" state (S24), the wireless LAN base station 300 can transmit the data signal to the terminal 400 that is connected to the wireless LAN base station (S25).

1.2.2 Example Operation of Base Station Device

Figure 9:
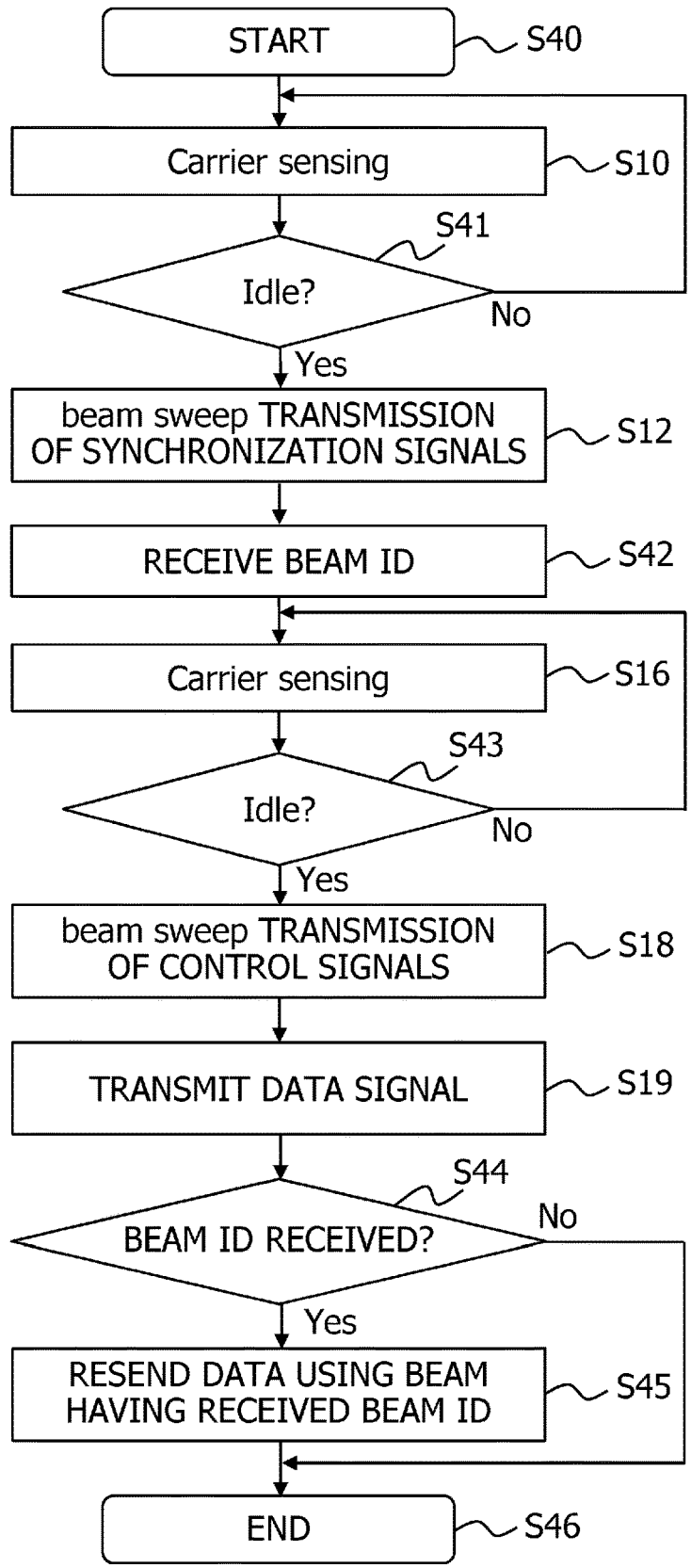
FIG. 9 is a flowchart illustrating an example operation of the base station device.

FIG. 9 is a flowchart illustrating an example operation of the base station 100. Identical processing to that of the example sequence illustrated in FIG. 7A has been allocated identical reference symbols, and any duplicate description has been simplified.

At the start of the processing (S40), the base station 100 performs carrier sensing on the unlicensed spectrum (S10) to determine whether or not the unlicensed spectrum is in the "idle" state (S41). When the unlicensed spectrum is not in the "idle" state (or when the unlicensed spectrum is in the "busy" state) (No in S41), the base station 100 performs carrier sensing again (S10).

When the unlicensed spectrum is in the "idle" state (Yes in S41), the base station 100 transmits the synchronization signals by beam sweeping using the unlicensed spectrum (S12).

Next, in response to beam sweep transmission of the synchronization signals (S12), the base station 100 receives the beam ID information of the optimum beam from the terminal 200 (S42).

Next, the base station 100 performs carrier sensing on the unlicensed spectrum (S16) to determine whether or not the unlicensed spectrum is in the "idle" state (S43). When the unlicensed spectrum is not in the "idle" state (or when the unlicensed spectrum is in the "busy" state) (No in S43), the base station 100 performs carrier sensing again (S16).

When, on the other hand, the unlicensed spectrum is in the "idle" state (Yes in S43), the base station 100 transmits the control signals by beam sweeping (S18) and transmits the data signal to the terminal 200 (S19).

Next, upon receipt of the beam ID of the optimum beam (Yes in S44), the base station 100 resends the data using a beam corresponding to the received beam ID information (S45). The base station 100 then terminates the series of processing (S46).

When the base station 100 does not receive the beam ID (No in S44), on the other hand, the base station 100 terminates the series of processing (S46) without resending the data.

Thus, in example 1, the wireless LAN base station 300 detects that the unlicensed spectrum is in the "busy" state by performing carrier sensing in response to beam sweep transmission of the control signals (S18), and accordingly defers data signal transmission. Hence, the data signal from the base station 100 (S19) does not collide with a signal from the wireless LAN base station, and as a result, the frequency with which the hidden terminal problem occurs in the wireless communication system 10 can be reduced.

Further, since the base station 100 uses control signals as beam sweep transmission subjects, a response to the hidden terminal problem and transmission of the wireless parameters can be realized using a single signal, for example.

According to example 1, therefore, in comparison with a case where these two elements are transmitted separately using separate signals, signal overheads can be eliminated from the wireless section, and as a result, an improvement in throughput can be achieved during user data transmission.

2 Example 2

Figure 10:
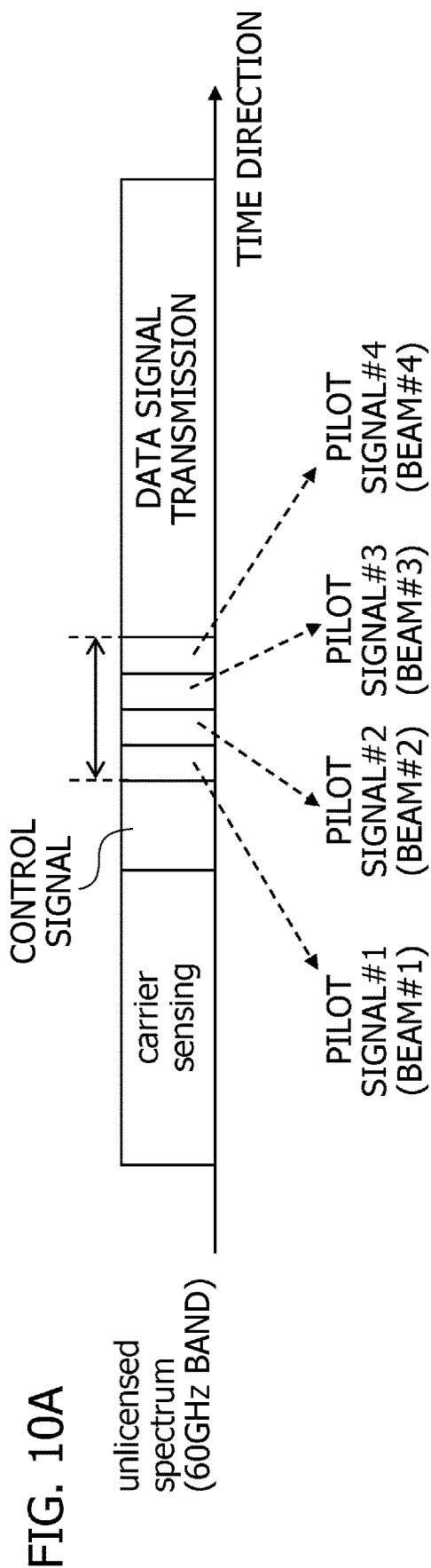
FIG. 10A is a view illustrating an example of use of an unlicensed spectrum.
FIGS. 10B to 10E are views illustrating examples of pilot signals.

FIG. 10A is a view illustrating specific examples of signals used in example 2.

As illustrated in FIG. 10A, the base station 100 performs carrier sensing in the unlicensed spectrum, transmits a control signal after confirming the "idle" state and before starting data signal transmission, and then transmits pilot signals (or reference signals) by beam sweeping. More specifically, the base station 100 transmits pilot signal #1 by forming beam #1, and then transmits pilot signal #2 by forming beam #2. Thereafter, the base station 100 forms beams #3 and #4 and transmits pilot signals #3 and #4 in succession. Beams #1 to #4 correspond respectively to FIGS. 2B to 2E, for example.

FIGS. 10B to 10E are views illustrating examples of information included in the pilot signals. The pilot signals are signals generated using a signal sequence such as a pseudo-random sequence by employing a predetermined code string parameter (or variable), for example. Example 2 is an example in which a parameter relating to the code string of each pilot signal is associated with the beam ID, and pilot signals #1 to #4 are generated using the associated code string parameters.

Note that, for example, the number of signal symbols of the pilot signals may be included in the control signal, or the terminal 200 may be notified thereof in advance before the control signal is transmitted. In the example of FIG. 10A, the number of signal symbols of the pilot signals is "4", but any number equal to or larger than "2" may be used.

Further, the terms pilot signal and reference signal will be used interchangeably hereafter.

2.1 Example Configurations of Base Station and Terminal According to Example 2

Figure 11:
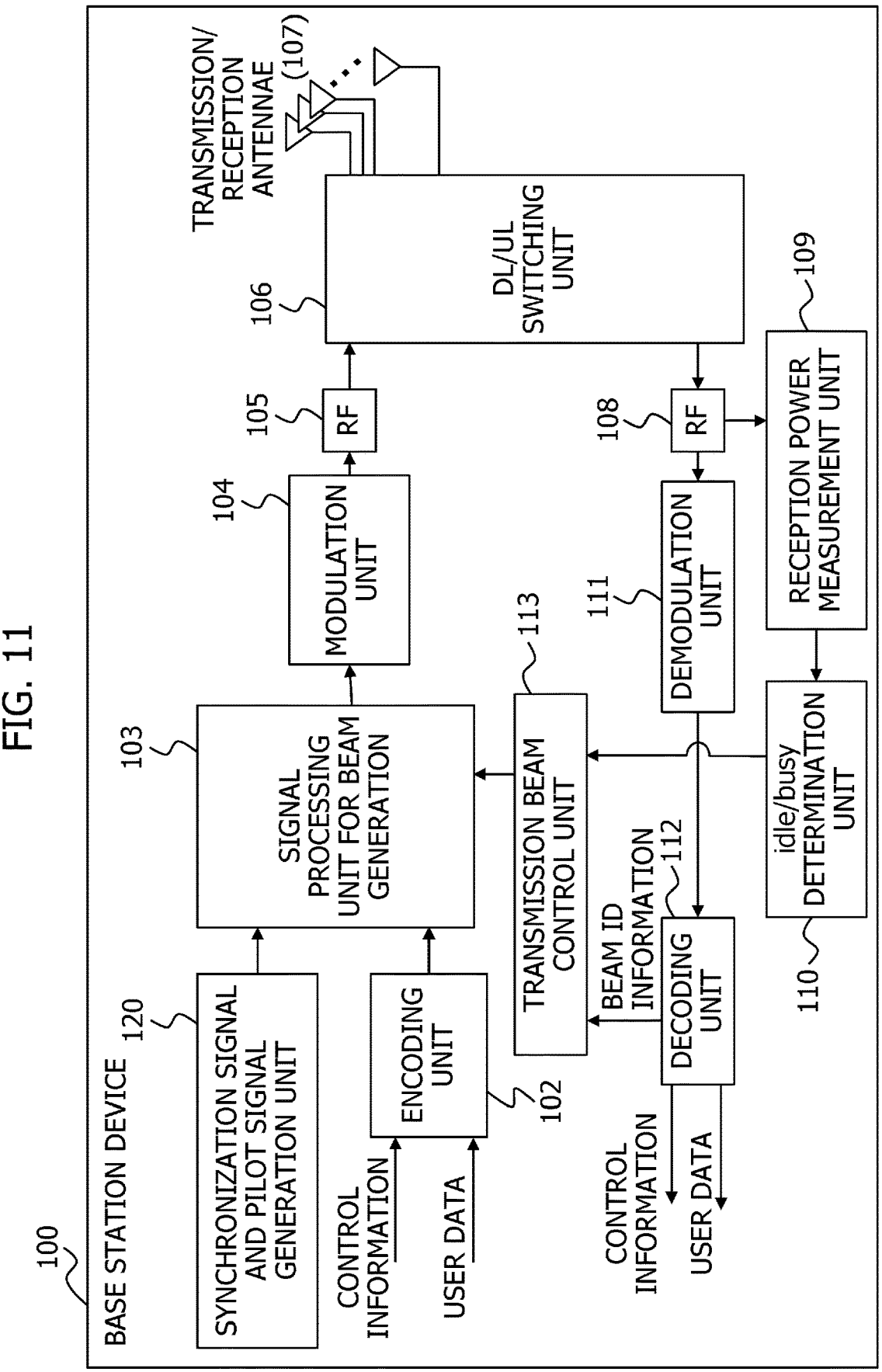
FIG. 11 is a view illustrating an example configuration of the base station device.

FIG. 11 is a view illustrating an example configuration of the base station 100 according to example 2. The base station 100 additionally includes a synchronization signal and pilot signal generation unit 120.

The synchronization signal and pilot signal generation unit 120 is a signal generation unit that generates synchronization signals and pilot signals and outputs the generated signals to the signal processing unit 103. For example, the synchronization signal and pilot signal generation unit 120 generates respective pilot signals #1 to #4 as follows.

The synchronization signal and pilot signal generation unit 120 generates the pilot signal to be transmitted by beam #1 by generating a signal sequence such as a pseudo-random sequence using the code string parameter related to beam #1. Similarly, the synchronization signal and pilot signal generation unit 120 generates the pilot signal to be transmitted by beam #2 using the code string parameter related to beam #2. Thereafter, the synchronization signal and pilot signal generation unit 120 generates the respective pilot signals #3 and #4 using the code string parameters related respectively to the beams #3 and #4.

The transmission beam control unit 113, having acquired a determination result indicating the "idle" state from the idle/busy determination unit 110, outputs a command signal commanding beam sweep transmission of the pilot signals to the signal processing unit 103.

With respect to the pilot signals, for example, the signal processing unit 103, having acquired the command signal commanding beam sweep transmission of the pilot signals, outputs pilot signals acquired by adjusting the phases of pilot signals respectively transmitted from the antennae 107. At this time, the signal processing unit 103 outputs a plurality of pilot signals having different phases in the time domain a plurality of times in succession in accordance with the time, direction, period, and so on of the beam sweeping, which are included in the command signal. Thus, pilot signals can be transmitted from the antennae 107 by beam sweep transmission, for example.

Figure 12:
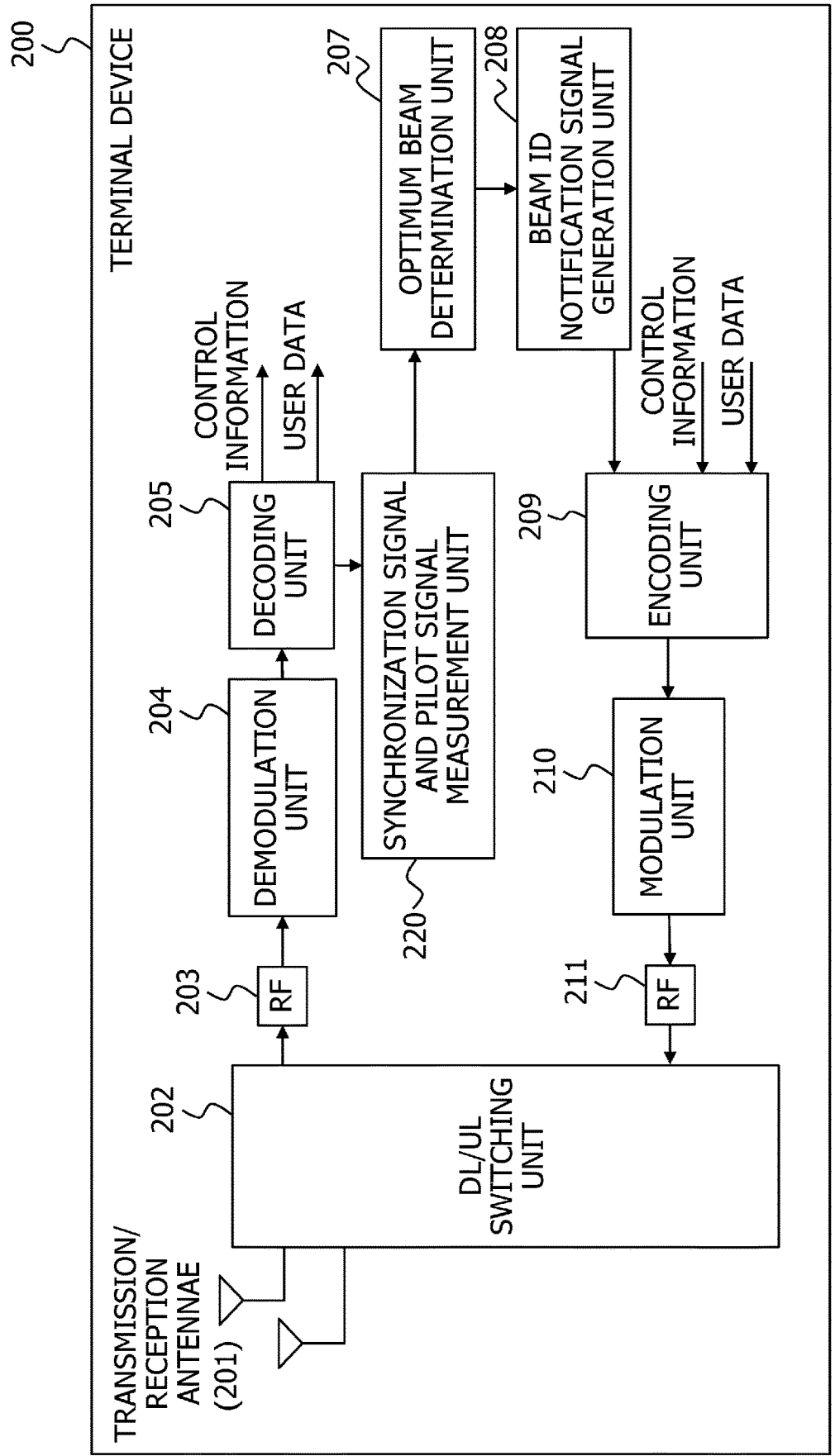
FIG. 12 is a view illustrating an example configuration of the terminal device.
Figure 13:
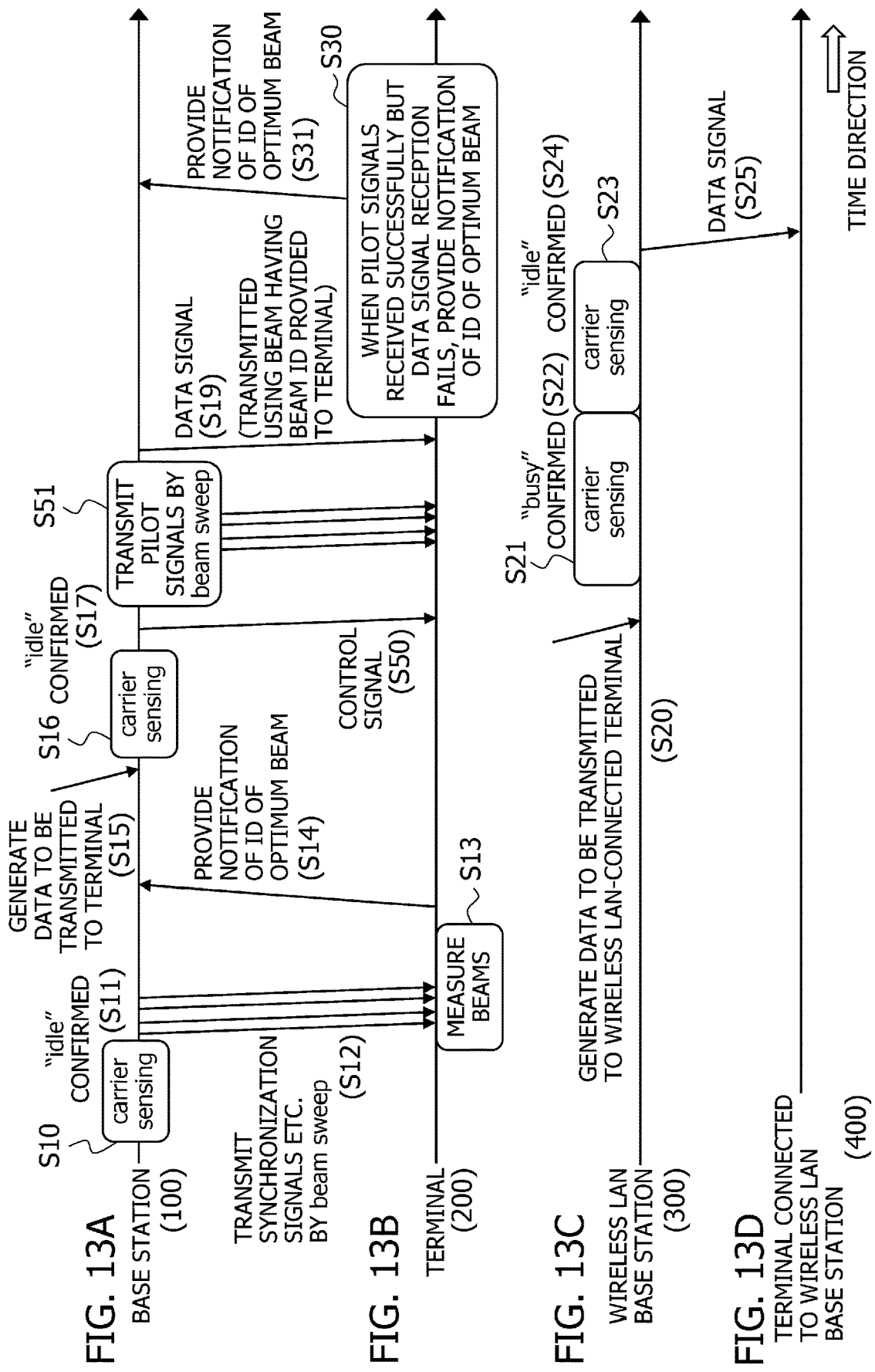
FIGS. 13A to 13D are sequence diagrams illustrating an example operation of the wireless communication system.

FIG. 12 illustrates an example configuration of the terminal 200 according to example 2. The terminal 200 additionally includes a synchronization signal and pilot signal measurement unit 220.

The decoding unit 205 extracts a beam ID from a decoded pilot signal as follows, for example. The decoding unit 205 applies a plurality of code string parameters successively to the decoded pilot signal, and having acquired a predetermined value, assumes that the corresponding code string parameter is the code string parameter used to generate the pilot signal, and extracts the code string parameter. The decoding unit 205 then extracts the beam ID from the extracted code string parameter. The decoding unit 205 then outputs the extracted beam ID and the decoded pilot signal to the synchronization signal and pilot signal measurement unit 220.

The synchronization signal and pilot signal measurement unit 220 measures the plurality of pilot signals transmitted by beam sweep transmission, for example, and outputs a measurement result for each beam to the optimum beam determination unit 207. The synchronization signal and pilot signal measurement unit 220 may use the reception power of the pilot signal, for example, as the measurement result. In this case, the synchronization signal and pilot signal measurement unit 220 outputs the beam ID received from the decoding unit 205 and the measurement result acquired in relation thereto to the optimum beam determination unit 207.

The optimum beam determination unit 207 determines the optimum beam from the plurality of measurement results, and outputs the beam ID of the determined optimum beam to the beam ID notification signal generation unit 208. For example, similarly to example 1, the optimum beam determination unit 207 may determine the beam in which the pilot signal having the largest reception power was transmitted to be the optimum beam and output the beam ID of that beam.

The beam ID notification signal generation unit 208 generates a beam ID notification signal including the beam ID of the optimum beam as beam information, and transmits the generated beam ID notification signal to the base station 100.

2.2 Example Operation of Example 2

2.2.1 Example Sequence

FIGS. 13A to 13D are views illustrating an example sequence of example 2. In FIGS. 13A to 13D, identical processing to example 1 has been allocated identical reference numerals.

The base station 100 performs carrier sensing on the unlicensed spectrum (S16), and after confirming that the unlicensed spectrum is in the "idle" state (S17), transmits a control signal (S50). For example, the base station 100 performs the following processing.

The transmission beam control unit 113, having received a determination result indicating the "idle" state from the idle/busy determination unit 110, outputs to the signal processing unit 103 a command signal commanding output of the control information as is to the modulation unit 104. Upon receipt of the command signal, the signal processing unit 103 outputs the encoded control information to the modulation unit 104 as is, without performing any particular processing thereon. As a result, it becomes possible to transmit control signals from the antennae 107.

Next, the base station 100 transmits the pilot signals by beam sweeping (S51). For example, the base station 100 performs the following processing.

After outputting the command signal relating to the control information, the transmission beam control unit 113 outputs a command signal commanding beam sweep transmission of the pilot signals to the signal processing unit 103. The transmission beam control unit 113 outputs a command signal including the time, direction, period, and so on of the beam sweeping. The signal processing unit 103, having received the command signal, can perform beam sweep transmission on the pilot signals by adjusting the phases of the pilot signals in accordance with the time, direction, period, and so on of the beam sweeping. Similarly to example 1, a precoding matrix may be used for the phase adjustment.

Meanwhile, in the wireless LAN base station 300, carrier sensing is performed on the unlicensed spectrum (S21) in response to the generation of data to be transmitted to the wireless LAN-connected terminal (S20), whereby the signals transmitted from the base station 100 by beam sweeping are detected. Accordingly, the wireless LAN base station 300 confirms that the unlicensed spectrum is in the "busy" state (S22) and performs carrier sensing again (S23). Meanwhile, the wireless LAN base station 300 defers signal transmission. Hence, likewise according to example 2, signals from the base station 100 do not collide with signals from the wireless LAN base station 300 in the terminal 200, and as a result, the frequency with which the hidden terminal problem occurs in the unlicensed frequency band can be reduced.

Similarly to example 1, when the terminal 200 successfully receives the pilot signals (S51) but fails to receive a data signal, the terminal 200 transmits the beam ID of the optimum beam to the base station 100 on the basis of the pilot signals (S30, S31). As a result, for example, the base station 100 can form a beam in an optimum beam direction for the terminal 200 and resend the data signal thereto.

For example, the terminal 200 performs the following processing. The synchronization signal and pilot signal measurement unit 220 measures the reception power of each of the plurality of pilot signals and outputs the measurement results to the optimum beam determination unit 207. The optimum beam determination unit 207 determines the beam ID of the pilot signal having the optimum measurement result, such as the largest reception power, to be the optimum beam, and outputs the determined beam ID to the beam ID notification signal generation unit 208. Note that the RF unit 211 converts the modulated beam ID notification signal from the baseband spectrum to a licensed spectrum. As a result, similarly to example 1, the beam ID information is transmitted using a licensed spectrum.

Figure 14:
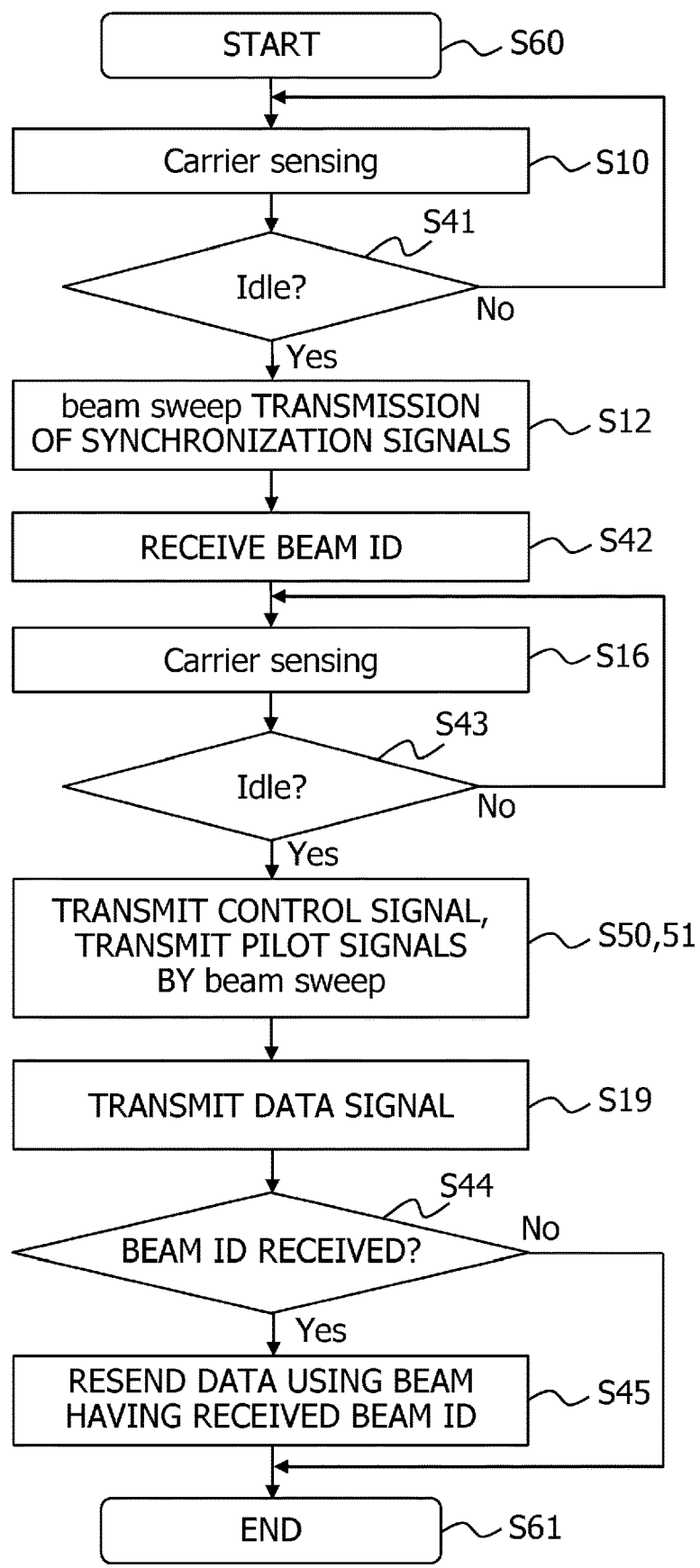
FIG. 14 is a flowchart illustrating an example operation of the base station device.

FIG. 14 is a flowchart illustrating an example operation of the base station 100 according to example 2. In FIG. 14, identical processing parts to example 1 (FIG. 9, for example) and FIG. 13A have been allocated identical reference symbols.

As illustrated in FIG. 14, the base station 100 performs carrier sensing on the unlicensed spectrum (S16), transmits a control signal after confirming the "idle" state (Yes in S43) and before starting data signal transmission, and then transmits the pilot signals by beam sweeping (S50 and S51).

In example 2, the signals subjected to beam sweep transmission are the pilot signals used for beam measurement. Therefore, the base station 100 can both eliminate the hidden terminal problem and acquire the beam ID information of the optimum beam. According to example 2, therefore, in comparison with a case where these two elements are transmitted separately using separate signals, signal overheads can be eliminated from the wireless section, and as a result, an improvement in throughput can be achieved during user data transmission.

3 Example 3

FIG. 15A is a view illustrating specific examples of signals used in example 3.

As illustrated in FIG. 15A, the base station 100 performs carrier sensing on the unlicensed spectrum and transmits pilot signals by beam sweeping after confirming the "idle" state and before starting data signal transmission. Meanwhile, before starting data signal transmission, the base station 100 transmits a control signal using a licensed spectrum. Hence, in example 3, the base station 100 transmits pilot signals by beam sweep transmission in the unlicensed spectrum and transmits a control signal in the licensed spectrum.

Note that similarly to example 2, pilot signals #1 to #4 are illustrated respectively in FIGS. 10B to 10E, while beams #1 to #4 are illustrated respectively in FIGS. 2B to 2E, for example.

Similarly to example 2, the number of signal symbols of the pilot signals may be included in the control signal, for example, or the terminal 200 may be notified thereof in advance before the control signal is transmitted. Further, in the example of FIG. 15A, the number of signal symbols of the pilot signals is "4", but any number equal to or larger than "2" may be used.

Similarly to example 2, the example configurations of the base station 100 and the terminal 200 according to example 3 are illustrated respectively in FIGS. 11 and 12, for example. In this case, for example, the RF unit 105 of the base station 100 frequency-converts the control signal from the baseband spectrum to the licensed spectrum and frequency-converts the pilot signals, the data signal, the synchronization signals, and so on from the baseband spectrum to the unlicensed spectrum. Similarly, the RF unit 203 of the terminal 200 frequency-converts the control signal from the licensed spectrum to the baseband spectrum and frequency-converts the pilot signals, the data signal, the synchronization signals, and so on from the unlicensed spectrum to the baseband spectrum.

FIGS. 16A to 16D are timing charts illustrating an example operation of example 3. In FIGS. 16A to 16D, identical processing parts to examples 1 and 2 have been allocated identical reference symbols.

As illustrated in FIG. 16A, the base station 100 transmits a control signal to the terminal 200 before transmitting a data signal (S70). In the example of FIG. 16A, the base station 100 transmits the control signal while performing carrier sensing on the unlicensed spectrum (S16).

After confirming the "idle" state during the carrier sensing (S17), the base station 100 transmits pilot signals by beam sweeping (S71). Thereafter, the processing is similar to examples 1 and 2.

Figure 17:
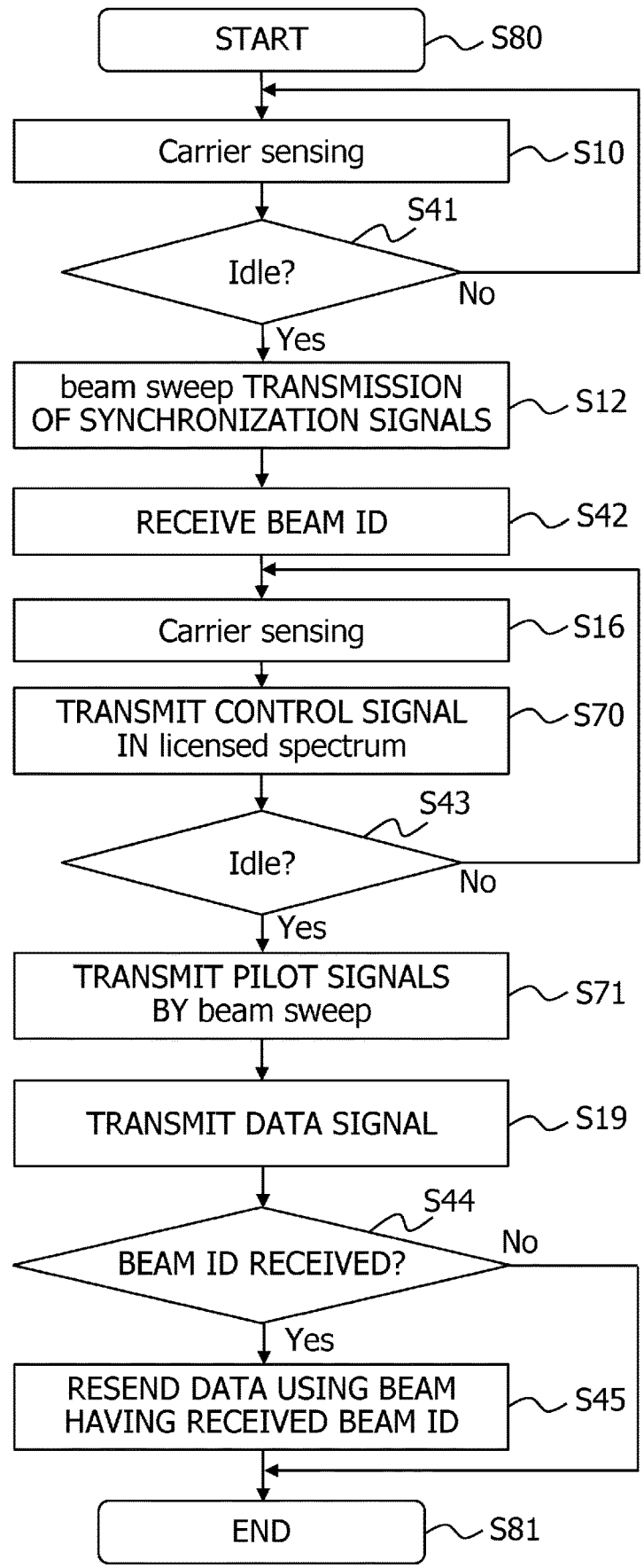
FIG. 17 is a flowchart illustrating an example operation of the base station device.

FIG. 17 is a flowchart illustrating an example operation of the base station 100. The base station 100 transmits a control signal in the licensed spectrum (S70) while performing carrier sensing (S16) and confirms whether or not the "idle" state is established (S43). When the "idle" state is established (Yes in S43), the base station 100 transmits pilot signals by beam sweeping (S71).

Likewise in example 3, in the wireless LAN base station 300, the "busy" state is confirmed (S22) when the signals transmitted by beam sweeping are detected, and therefore no signals are transmitted. As a result, the frequency with which the hidden terminal problem occurs can likewise be reduced in example 3.

Further, likewise in example 3, the signals subjected to beam sweep transmission are the pilot signals used for beam measurement. Therefore, similarly to example 2, signal overheads can be eliminated from the wireless section, and as a result, an improvement in throughput can be achieved during user data transmission.

Moreover, in example 3, the base station 100 transmits the control signal using the licensed spectrum. In comparison with example 2, therefore, the usage efficiency of the unlicensed spectrum can be improved, thereby allowing an increase in the data signal transmission period, and as a result, an improvement in throughput can be achieved in the unlicensed spectrum.

4 Example 4

Figure 18:
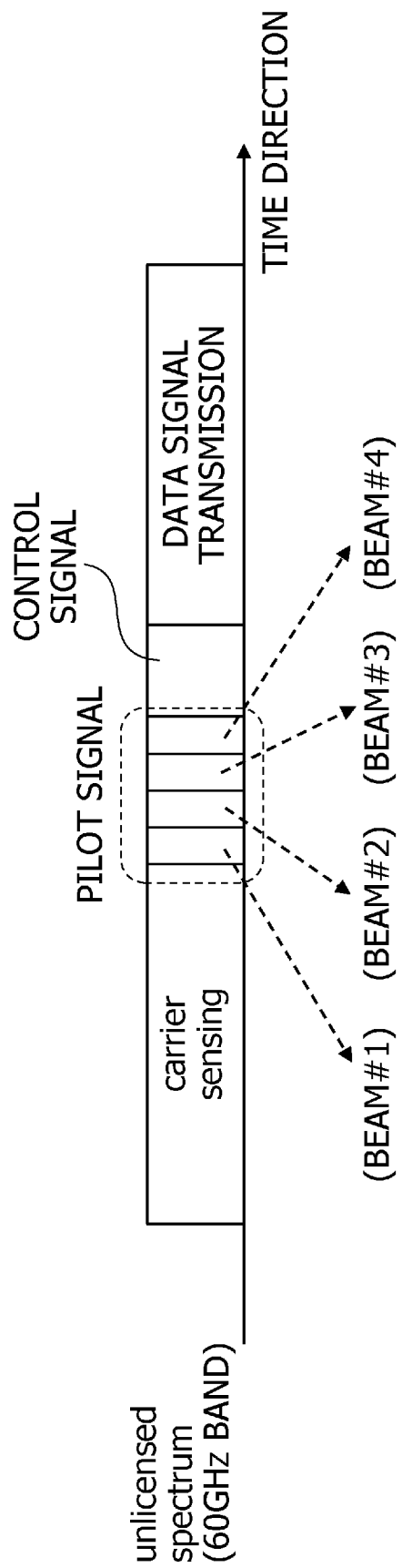
FIG. 18 is a view illustrating an example of use of an unlicensed spectrum.

FIG. 18 is a view illustrating specific examples of signals used in example 4.

As illustrated in FIG. 18, in example 4, the base station 100 performs carrier sensing on the unlicensed spectrum and transmits pilot signals by beam sweeping after confirming the "idle" state. Thereafter, the base station 100 transmits a control signal and a data signal.

In this case, the base station 100 transmits the pilot signals by beam sweeping merely with the aim of alerting the wireless LAN base station 300 to the fact that signal transmission is underway in the unlicensed spectrum. Accordingly, in example 4, for example, the pilot signals transmitted by the respective beams may all have identical code strings, in contrast to examples 2 and 3 (FIGS. 10B to 10E, for example), in which ID information or the like is associated with each pilot signal.

Example configurations of the base station 100 and the terminal 200 according to example 4 are illustrated respectively in FIGS. 11 and 12, for example. In this case, for example, the synchronization signal and pilot signal generation unit 120 outputs pilot signals having identical code strings a plurality of times in succession without associating beam IDs with the code string parameters.

FIGS. 19A to 19D are views illustrating an example sequence of example 4. In this case, the base station 100 performs carrier sensing in the unlicensed spectrum (S16) and, after confirming "idle" (S17), transmits the pilot signals by beam sweeping (S90). The base station 100 then transmits a control signal (S91), and then transmits a data signal (S19).

FIG. 14 is a flowchart illustrating an example operation of the base station 100 according to example 4. In this case, "transmit pilot signals by beam sweeping (S90) and transmit control signal (S91)" may be substituted for S50 and S51.

Likewise in example 4, in the wireless LAN base station 300, the "busy" state is confirmed (S22) when the signals transmitted by beam sweeping are detected, and therefore no signals are transmitted. As a result, the frequency with which the hidden terminal problem occurs can likewise be reduced in example 4.

5 Example 5

FIGS. 20A and 20B are views illustrating specific examples of signals used in example 5.

In example 4, the pilot signals and the control signal were transmitted using the unlicensed spectrum, whereas example 5 is an example in which the pilot signals are transmitted using the unlicensed spectrum but the control signal is transmitted using a licensed spectrum.

Likewise in example 5, the base station 100 performs carrier sensing on the unlicensed spectrum and transmits pilot signals by beam sweeping after confirming the "idle" state. In this case, similarly to example 4, the base station 100 transmits the pilot signals by beam sweeping merely with the aim of alerting the wireless LAN base station 300 to the fact that signal transmission is underway in the unlicensed spectrum. Accordingly, the base station 100 does not associate ID information or the like with each pilot signal, and the pilot signals transmitted by the respective beams may all have the same code strings.

Similarly to example 4, example configurations of the base station 100 and the terminal 200 according to example 5 are illustrated respectively in FIGS. 11 and 12, for example.

FIGS. 21A to 21D are views illustrating an example sequence of example 5. In this case, the base station 100 performs carrier sensing in the unlicensed spectrum (S16) and, after confirming "idle" (S17), transmits the pilot signals by beam sweeping (S100). Further, while transmitting the pilot signals by beam sweeping, the base station 100 transmits a control signal using a licensed spectrum (S101). The control signal includes the wireless parameters, for example, and therefore the base station 100 may transmit the control signal before transmitting a data signal.

Likewise in example 5, in the wireless LAN base station 300, the "busy" state is confirmed (S22) when the signals transmitted by beam sweeping are detected, and therefore no signals are transmitted. As a result, the frequency with which the hidden terminal problem occurs in the unlicensed spectrum can be reduced.

Other Embodiments

FIGS. 22A to 22F are views illustrating an example of another embodiment.

In this other embodiment, when the duration of a data signal transmission period reaches or exceeds a threshold, beam sweep transmission is performed again.

For example, the base station 100 implements beamforming in order to form a beam for transmitting a data signal in a certain direction (FIG. 22F). If the wireless LAN base station 300 exists in the direction of FIG. 22B, the wireless LAN base station 300 cannot detect the data signal when the data signal is transmitted in the direction of FIG. 22F. In this case, as the data signal transmission period increases in duration, the wireless LAN base station 300 performs carrier sensing over a correspondingly longer period and is therefore more likely to determine the "idle" state.

Hence, as described above, when the data signal transmission period reaches or exceeds a threshold, the base station 100 interrupts transmission of the data signal and transmits signals by beam sweeping again. For example, the signal processing unit 103 illustrated in FIG. 5 or FIG. 11 counts the user data transmission period, and when the counted transmission period reaches or exceeds a threshold, the signal processing unit 103 transmits control signals or pilot signals by beam sweeping again, and then resumes transmission of the data signal.

By having the base station 100 transmit the signals by beam sweeping again in this manner, situations in which the wireless LAN base station 300 determines the "idle" state when the data signal transmission period reaches or exceeds a threshold can be prevented from occurring. As a result, the frequency of collisions between signals from the base station 100 and signals from the wireless LAN base station 300 can be reduced, enabling a reduction in the frequency with which the hidden terminal problem occurs.

Figure 23A:
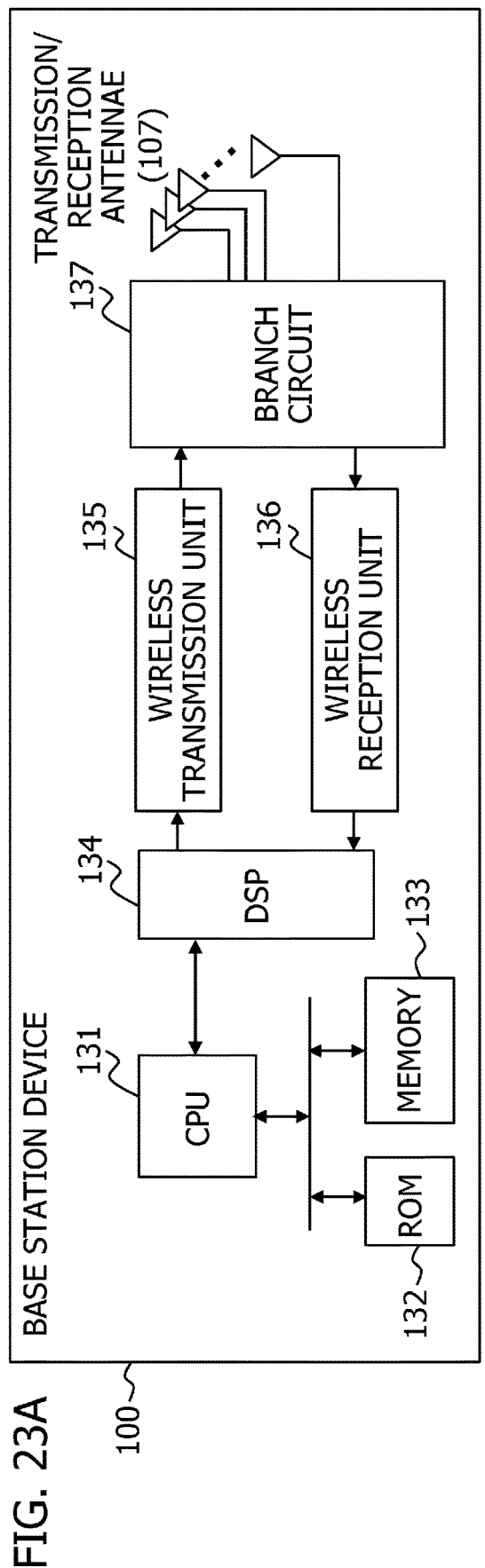
FIGS. 23A and 23B are views illustrating example hardware configurations of the base station device and the terminal device, respectively.
Figure 23B:
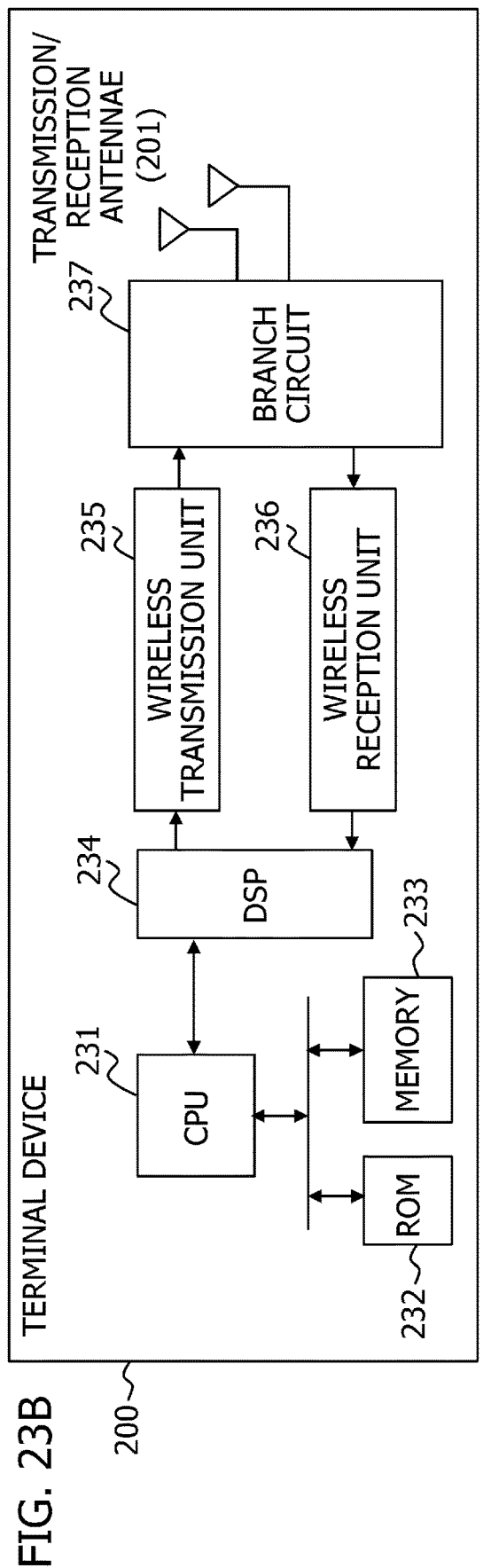

FIGS. 23A and 23B are views respectively illustrating example hardware configurations of the base station 100 and the terminal 200.

The base station 100 further includes a central processing unit (CPU) 131, a read only memory (ROM) 132, a memory 133, a digital signal processor (DSP) 134, a wireless transmission unit (or transmission unit) 135, a wireless reception unit (or reception unit) 136, and a branch circuit 137.

The CPU 131 realizes the functions of the encoding unit 102, the signal processing unit 103, the idle/busy determination unit 110, the decoding unit 112, the transmission beam control unit 113, and the synchronization signal and pilot signal generation unit 120 by reading and executing a program stored in the ROM 132. For example, the CPU 131 corresponds to the encoding unit 102, the signal processing unit 103, the idle/busy determination unit 110, the decoding unit 112, the transmission beam control unit 113, and the synchronization signal and pilot signal generation unit 120 of the first embodiment.

Further, for example, the DSP 134 corresponds to the synchronization signal generation unit 101, the modulation unit 104, the demodulation unit 111, and the reception power measurement unit 109 of the first embodiment. Furthermore, for example, the wireless transmission unit 135 corresponds to the RF unit 105 of the first embodiment. Moreover, for example, the wireless reception unit 136 corresponds to the RF unit 108 of the first embodiment. In addition, for example, the branch circuit 137 corresponds to the DL/UL switching unit 106 of the first embodiment.

The terminal 200 further includes a CPU 231, a ROM 232, a memory 233, a DSP 234, a wireless transmission unit 235, a wireless reception unit 236, and a branch circuit 237.

The CPU 231 realizes the functions of the decoding unit 205, the synchronization signal and control signal measurement unit 206, the optimum beam determination unit 207, the beam ID notification signal generation unit 208, and the encoding unit 209 by reading and executing a program stored in the ROM 232. The CPU 231 also realizes the functions of the synchronization signal and pilot signal measurement unit 220 by executing the program. For example, the CPU 231 corresponds to the decoding unit 205, the synchronization signal and control signal measurement unit 206, the optimum beam determination unit 207, the beam ID notification signal generation unit 208, the encoding unit 209, and the synchronization signal and pilot signal measurement unit 220 of the first embodiment.

Further, for example, the DSP 234 corresponds to the demodulation unit 204 and the modulation unit 210 of the first embodiment. Furthermore, for example, the wireless transmission unit 235 and the wireless reception unit 236 correspond respectively to the RF unit 203 and the RF unit 211 of the first embodiment. Moreover, for example, the branch circuit 237 corresponds to the DL/UL switching unit 202 of the first embodiment.

Note that processors, controllers, or the like such as a DSP, a micro-processing unit (MPU), or a field programmable gate array (FPGA) may be used instead of the CPUs 131 and 231.

In examples 1 to 5 described above, examples in which the base station 100 transmits synchronization signals by beam sweeping (S12 in FIG. 7A, for example) were described. However, the base station 100 may transmit pilot signals, control signals, or the like, for example, by beam sweeping instead of synchronization signals.

Further, in the above embodiments, examples of digital beamforming were described. However, hybrid beamforming, for example, which combines digital beamforming and analog beamforming, may also be employed. In this case, as the analog beamforming, a phase control circuit may be provided on the lines of the respective antennae 107 between the DL/UL switching unit 106 and the antennae 107, for example. The phase control circuit controls the directivity of the beams by controlling the phases of analog signals input respectively into the plurality of antennae 107, for example. By employing hybrid beamforming, for example, weights and preforming matrices used in the analog beamforming can be optimized, and numbers of converters and baseband processing circuits can also be optimized.

Furthermore, in the above embodiments, for example, the 60 GHz band was described as an example of an unlicensed spectrum. Other examples of unlicensed spectra include the 5 GHz band, the 37 GHz band, and so on, for example.

Moreover, in the above embodiments, examples in which the base station 100 performs beam sweep transmission were described. Instead, for example, the terminal 200 may transmit signals by beam sweeping using the unlicensed spectrum so as to form beams for the terminal 400 and the wireless LAN base station 300. In this case, an example configuration of the terminal 200 is as illustrated in FIGS. 5 and 11, for example, and an example configuration of the base station 100 is as illustrated in FIGS. 6 and 12, for example. Likewise in this case, by having the terminal 200 transmit signals (control signals, pilot signals, or the like, for example) by beam sweeping, it is assumed that the terminal 400 or the wireless LAN base station 300 will determine the "busy" state upon detection of these signals while performing carrier sensing in the unlicensed spectrum. Accordingly, the terminal 400 or the wireless LAN base station 300 defers signal transmission in the unlicensed spectrum so that no collisions occur with the signals traveling toward the base station 100, and as a result, the frequency with which the hidden terminal problem occurs can be reduced.

According to this disclosure, the frequency with which the hidden terminal problem occurs during wireless communication using an unlicensed frequency band can be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication device that communicates wirelessly with another wireless communication device, the wireless communication device comprising:

a determination controller configured to determine whether or not an unlicensed frequency band is available;

a signal generator configured to generate a plurality of pilot signals; and a transmitter configured to:

when the unlicensed frequency band is available, transmit, using the unlicensed frequency band before starting to transmit a data signal, the plurality of pilot signals, wherein each pilot signal of the plurality of pilot signals has a phase, and the phases are different phases in a time domain; and transmit a control signal that includes information about the plurality of pilot signals using a licensed frequency band before starting to transmit the data signal.

2. The wireless communication device according to claim 1, wherein the transmitter is configured to, after confirming that the unlicensed frequency band is available and before starting to transmit the data signal, use the unlicensed frequency band to transmit a control signal and transmit the plurality of pilot signals having different phases, respectively, in the time domain a plurality of times in succession.

3. The wireless communication device according to claim 2, wherein the signal generator is configured to generate the plurality of phase-adjusted pilot signals using a parameter relating to code strings of the pilot signals, the parameter being associated with identification information for differentiating beams formed when the plurality of pilot signals are transmitted from the transmitter from other beams formed in other time domains.

4. The wireless communication device according to claim 1, wherein, when the unlicensed frequency band is available, the transmitter is configured to transmit the plurality of pilot signals having the different phases, respectively, in the time domain a plurality of times in succession using the unlicensed frequency band before starting to transmit the data signal.

5. The wireless communication device according to claim 1, wherein the transmitter is configured to, when the unlicensed frequency band is available, transmit the plurality of pilot signals having the different phases, respectively, in the time domain a plurality of times in succession and to transmit a control signal using the unlicensed frequency band before starting to transmit the data signal.

6. The wireless communication device according to claim 2, wherein the signal generator is configured to generate the plurality of pilot signals so as to have identical code strings.

7. The wireless communication device according to claim 3, wherein the signal generator is configured to generate the plurality of pilot signals so as to have identical code strings.

8. The wireless communication device according to claim 4, wherein the signal generator is configured to generate the plurality of pilot signals so as to have identical code strings.

9. The wireless communication device according to claim 5, wherein the signal generator is configured to generate the plurality of pilot signals so as to have identical code strings.

10. The wireless communication device according to claim 1, wherein the information about the plurality of pilot signals includes the number of signal symbols of the plurality of pilot signals.

\* \* \* \* \*